United States Patent
Schmit et al.

(10) Patent No.: US 7,283,250 B2
(45) Date of Patent: Oct. 16, 2007

(54) MEASUREMENT OF OBJECT DEFORMATION WITH OPTICAL PROFILER

(75) Inventors: Joanna Schmit, Tucson, AZ (US); Paul R. Unruh, Oro Valley, AZ (US); Erik L. Novak, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 312 days.

(21) Appl. No.: 10/759,686

(22) Filed: Jan. 16, 2004

(65) Prior Publication Data

US 2005/0157306 A1 Jul. 21, 2005

(51) Int. Cl.
*G01B 9/02* (2006.01)
(52) U.S. Cl. ...................... 356/512; 356/495
(58) Field of Classification Search ............. 356/489, 356/495, 496, 498, 511, 516, 512, 497; 250/559.05; 382/108
See application file for complete search history.

(56) References Cited

U.S. PATENT DOCUMENTS 6,624,894 B2 * 9/2003 Olszak et al. ............... 356/511

2002/0196450 A1 12/2002 Olszak et al.

OTHER PUBLICATIONS

Michael Pawlowski et al. in "Shape and motion measurement of time-varying three-dimensional objects based on spatiotemporal fringe-pattern analysis," Opt. Eng. 41(2) 450-459 (2002).
Xavier Colonna de Lega et al. in "Deformation measurement with object-induced dynamic phase shifting," Applied Optics, vol. 35, No. 25, 5115-5121 (1996).

* cited by examiner

*Primary Examiner*—Hwa (Andrew) Lee
(74) *Attorney, Agent, or Firm*—Antonio R. Durando

(57) ABSTRACT

An interferometric profiler is used to measure object motion by modifying the motion of the scanner so that the phase variation at each scanning step is kept within the acceptable limits of the algorithm used to calculate phase changes. The scanner motion is so manipulated on the basis of prior knowledge about the nature of the object motion, or knowledge obtained by pre-calibration, or by real-time feedback based on current measurements. The object motion is recovered from the scanning information by subtracting the scanner position from the object position as it evolves during the scan.

18 Claims, 27 Drawing Sheets

MEASUREMENT OF OBJECT DEFORMATION WITH OPTICAL PROFILER

BACKGROUND OF THE INVENTION

1. Field of the Invention

This invention relates in general to the field of scanning interferometry and, in particular, to a new approach for measuring sample deformations occurring during interferometric measurements.

2. Description of the Prior Art

Recent developments in micro-optics and micro-electromechanical systems (MEMS) technology produced a variety of engineered micro-elements, ranging from gears and mirror arrays to membranes, resonators and accelerators. Inasmuch as these micro-elements (which vary in size from micrometers to millimeters) are susceptible to shape changes while in operation, a need has arisen for measuring not only their static shape but also their motion behavior (that is, the vertical displacement due to operational motion and shape changes due to vibration, deformation, and the like).

Traditional surface profilometry has dealt with the characterization of the surface profile of a static object. In scanning interferometric measurements, the surface of the object is scanned vertically (that is, the direction normal to the plane of the test surface) to produce interferograms that are acquired as the optical path difference between the object and a reference mirror is varied. In accordance with conventional terminology, the term "out-of-plane" is used in this disclosure to refer to the direction of scanning (regarding the sample object's surface displacement). The term "object motion" is used to refer to the cumulative out-of-plane displacement of the surface of the test object as a result of its operational motion and other external influences, such as vibration, deformation, etc. Object motion is not intended to include the motion resulting from scanning of the test object.

For the purposes of this disclosure, object motion is considered slow when it is negligible for shape-measurement detection, so that the object can be considered static (both conditions that are present in conventional profilometry). Such slow, quasi-static, motion can arise, for example, from thermal or pressure loading, or from creeping or shrinkage. The frequency of such slow motion is much lower than the sampling rate of the detecting system. Fast motion, on the other hand, is characterized by frequencies much higher than that of the sampling system and typically arises from a shock wave propagating through the object as a result of mechanical impact, or from the application of a high-frequency voltage pulse, as is the case in MEMS operation.

The range of motion (which may also be referred to as the dynamic range of motion or amplitude) is another relevant characteristic of object motion and it can be described, for example, in units of wavelength of light. The dynamic range of object motion depends on the object's mechanical and operational characteristics and may range, for instance, from fractions of a wavelength, for small vibrations and stress deformations that are essential for MEMS-membrane operation, to several tens of a wavelength or more for micromirror movements that find their use in tunable photonic devices.

Several techniques have been reported that can be used for limited measurements of different types of object motion, such as digital holography (applicable to reflecting and scattering surfaces), and digital speckle pattern interferometry (DSPI) and electro-optic holography (both used for scattering surfaces). These techniques are limited in their applicability by the relatively long data-transfer times associated with area detectors. Another technique is Doppler vibrometry (for example, see Albrecht et al., "Laser Doppler and Phase Doppler Measurement Techniques," Springer-Verlag, 2002), which is based on heterodyne interferometry and utilizes fast detection of deformations at a single point (single-point detection). The limitation of this technique lies in the fact that the relative phase of vibrations at consecutive data points can be lost and therefore the recovery of object-motion information may be incorrect. All of these prior-art approaches can be used with continuous as well as stroboscopic illumination.

Other interferometric and fringe-projection techniques are described by Michael Pawlowski et al. in "Shape and motion measurement of time-varying three-dimensional objects based on spatiotemporal fringe-pattern analysis," Opt. Eng. 41(2) 450-459 (2002), and Xavier Colonna de Lega et al. in "Deformation measurement with object-induced dynamic phase shifting," Applied Optics, Vol. 35, No. 25, 5115-5121 (1996). These articles teach that fringes representing deformation can be analyzed when phase change is in an appropriate range.

The optical profilometric techniques traditionally used to determine object shape based on spatial or temporal analysis of fringe patterns are not always suitable for detecting object motion, as herein defined, because of phase-change constraints inherent with the algorithms associated with each technique. The discrepancy between the actual size of the measurement phase change introduced by object motion and the nominal size (the phase step) assumed and required by the algorithms used to perform interferometric analysis may prevent the use of the algorithms with any degree of reliability. For example, a conventional five-step phase algorithm (such as the Schwider/Hariharan algorithm) is based on a phase step of $\pi/2\pm\epsilon$ (typically about 5 degrees) between acquisition frames during the interferometric scan. If the object motion materially alters the actual phase change between the object and the reference surfaces, the algorithm will produce unreliable results. Thus, conventional profilometry is inadequate to measure motion when the object motion is characterized by a range of amplitudes or frequencies that are not suitable for the algorithms utilized in the system (and thus the information cannot be processed in converging fashion to describe the object motion).

Recent profilometric technique improvements, such as the use of a reference signal (described in U.S. Publication No. 2002-0196450, incorporated here by reference), addressed measurement precision but did not provide an avenue of compensation for object motion. Although the use of a reference signal makes it possible to correct scanner deviations from nominal performance, the computational constraints of the algorithms still prevent its general application in the measurement of object motion.

Conventional interferometric applications rely on precise measurements or knowledge of the changing optical path difference (OPD) between the test object and the reference surface as a result of scanning (or any equivalent method utilized to introduce a fringe shift, such as fringe projection techniques, wavelength shifting, polarization techniques, change of index of refraction in optical path, etc.). Specifically, the change in OPD (also commonly referred to in the art as "fringe shift") between frames and the corresponding change in phase (normally referred to as the "phase step") are used to calculate surface height. In the case of ideal scanning of a static object (i.e., scanning without motion errors of the scanner due to back-lashes, friction, etc.), the phase step will remain constant between sampling frames as determined by the scanner's design velocity profile (for example, 90 degrees at the mean wavelength used for illumination, including the effect of the angle of illumination). As such, the phase-versus-time plot is a straight line with a slope that corresponds to the constant design speed of the scanner, as illustrated in FIG. 1. As mentioned, the algorithms utilized for analysis allow deviations from ideal scanning behavior so long as the phase change remains within a predetermined "operational window," which is illustrated in the figure for each scanner step by the area bound by the upper and lower limit traces (straight dashed lines) around the phase plot. For instance, for a 90-degree phase-step algorithm, such an operational window may correspond to a phase step of $\pi/2 \pm \epsilon$ (the width of the operational window, typically about ±5 degrees, is illustrated disproportionately large for illustration).

If a sinusoidal object motion were present with an amplitude that caused the phase steps to remain within the operational window of the algorithm, as illustrated in FIG. 2 by the vertical phase-change window associated with each scanning step, it would still be possible to retrieve the object motion from conventional interferometric analysis because the algorithm would provide a measure of the phase change between acquisition frames, which in turn could be used in conventional manner to calculate the motion of the test surface in relation to the sample stage. On the other hand, if the object motion were more pronounced (such as, for example, characterized by a constant linear component and a harmonic component), the actual phase changes might not always be within the operational window of the algorithm, as illustrated in FIG. 3 (wherein the linear and sinusoidal components of the object motion are represented by straight dotted and sinusoidal continuous lines, respectively, and the phase change is shown outside the operational window for all steps except n+1). Accordingly, interferometric analysis would not allow accurate recovery of the object motion.

Therefore, to the extent that interferometric profilers are used for object characterization, conventional analysis approaches do not generally allow for proper monitoring of object motion on the basis of actual scanner position history. This invention provides a solution to this problem and achieves sub-wavelength accuracy in object motion measurements through the use of non-contact, optical methods.

SUMMARY OF THE INVENTION

The same interferometric principles that pertain to shape measurement with an optical profiler are applied to monitor the out-of-plane motion of the sample object. When an out-of-plane displacement occurs in the object (such as, for example, in a micro-cantilever with a tip that experiences a movement around its pivot point), a correspondingly changing interference signal is sensed by the instrument's detector recording the scanning signal. The object motion and the scanning motion yield a signal that corresponds to the cumulative phase change produced by both motions.

The change in optical path difference produced by the motion of the scanner (or shift of fringes controlled by any other means) is normally constant and controlled by scanning the objective along its optical axis through the focal point or, equivalently, by scanning the object through the focal point of the objective (or equivalently the reference mirror or the objective). This normally constant and controlled rate of scanning motion of the optical profiler is referred to as the "design" or "nominal" scanner motion and the correspondingly constant phase change between acquisition frames is referred to as the "phase step" of the scanner.

"Nominal rate" refers to the rate of scanning (or equivalently the rate of frame acquisition) that produces such phase step. In addition, because the invention is also applicable to interferometric systems wherein fringe shifts are produced by means other than scanning, the term "nominal rate" is intended to refer to the design rate at which the means for controlling phase change is actuated.

In view of the foregoing, the invention is directed at a method for monitoring object motion using conventional interferometric profilometry. A typical scanning interferomerer is used to illustrate the invention, but it is understood that the same principles apply to all interferometric systems, including those that produce fringe shifts by means other than scanning. Accordingly, the invention consists of modifying the interferometric profiler to provide a scanning motion appropriately chosen to maintain the phase variation between frames observed during a scan within the acceptable limits of the algorithm used to calculate phase changes. This is accomplished by assuring that the cumulative effect on the OPD change with respect to the reference surface produced by the scanner motion and the sample deformation produces phase-change data at each step that fall within the operational window of the processing algorithm (nearly $\pi/2$, for example). The scanner motion can be so manipulated on the basis of prior knowledge about the nature of the object motion, or of knowledge obtained by precalibration, or by real-time feedback based on current measurements. In such a case, the scanner motion may be adjusted automatically through feedback to deliver optimal measurement results as the scanner progresses in its motion. The object motion is then recovered from the scanning information by tracking the observed phase (or OPD) change from frame to frame. By comparing the phase variation measured by interferometric analysis with the phase change expected from the scanner motion, the out-of-plane object motion may be recovered in straightforward manner (that is, by the difference measured between the two at each step). If a reference signal is available, the actual phase step of the scanner measured by the reference signal is subtracted from the phase change measured by interferometric analysis, thereby improving the accuracy of the instrument.

In one embodiment of the invention, suitable especially to measure object motions of a linear nature, a comparable linear component is combined with the nominal motion of the scanner so as to cause the scanner to approximately track the object motion in addition to providing the phase-step OPD between acquisition frames necessary to produce useful interferograms. In another embodiment of the invention, a periodic component is combined (with or without a linear component) with the nominal scanner motion to approximately track object motions of a harmonic nature. In yet another embodiment, a nonlinear component of generic form is added to the scanner motion, the specific form always being selected with the objective of tracking the object motion to the maximum extent possible. In all cases, so long as the resulting phase steps measured by the detector remain within the operational window of the algorithms used to calculate phase as it evolves during the scan, good interferometric analysis is possible and available to recover the object motion.

Inasmuch as the same constraints apply to each pixel of the surface of a sample object, the principles of the invention may be carried out with different scanner motions based on varied deformations across the surface of the sample object (such as the difference between the tip and the base of a cantilever) or based on a scanner motion frequency found on average to be adequate to retain the requisite phase change between frames across the object (such as in the case of a MEMS with low-amplitude motion).

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

BRIEF DESCRIPTION OF THE DRAWINGS

FIG. 12A shows the monochromatic correlogram produced by a single pixel of a CCD camera during a nominal scan with the object in static condition. FIG. 12B shows the quadratic out-of-plane motion of the object. FIG. 12C shows the phase signal observed as a result of the object and nominal scanner motion. FIG. 12D shows the effect of object motion on the signal of FIG. 12A. FIG. 12E illustrates the adjusted scanner motion obtained by subtracting a quadratic component approximating the object motion from the nominal motion of the scanner. FIG. 12F shows the correlogram produced by the combination of the object motion and the adjusted scanner motion.

FIG. 13A shows the correlogram produced by a single pixel of a CCD camera in a scan with the object in static condition. FIG. 13B shows the sinusoidal out-of-plane motion of the object. FIG. 13C shows the phase signal observed as a result of the object and nominal scanner motion. FIG. 13D shows the effect of object motion on the signal of FIG. 13A. FIG. 13E illustrates the adjusted scanner motion obtained by subtracting a sinusoidal component approximating the object motion from the nominal motion of the scanner. FIG. 13F shows the phase-plot result produced by the combination of the object motion and the adjusted scanner motion.

DETAILED DESCRIPTION OF THE INVENTION

The inventive concept of this disclosure resides in the idea of appropriately introducing an additional component to the scanning motion in the interferometric profiler to produce phase changes between acquisition frames that ensure the proper utilization of the algorithms selected for interferometric analysis. The invention preferably utilizes narrow-band light sources to cover the entire range of operation of the scanner, as is commonly done in prior-art profilers. As is well understood, if a wider band light is used, the range of operation is restricted to the coherence of the light. Accordingly, the invention is suitable for implementation with most types of conventional interferometric techniques. In addition, the invention preferably also utilizes a narrow-band reference signal to accurately track scanner motion (or other equivalent means to track induced fringe motion).

The terms "interferogram," "interferometric" and "interferometric fringes" are used with the same meaning commonly understood in the art with reference to multi-step scans carried out for conventional interferometric measurements. The term "phase step" is used to refer to the change in phase between acquisition frames produced by the motion of the scanner with reference to a static object surface. In contrast, the term "phase change" is used to refer to the change in phase between acquisition frames produced cumulatively by the phase change and the object motion as actually measured by the algorithm used for interferometric analysis (that is, the phase change resulting by the cumulative scanner and object motion—which is also the phase change produced by the motion of the scanner with reference to the moving object surface). The term "pixel" is used to refer both to each sensing element of a detector and to the corresponding portion of the surface of the object being measured for interferometric analysis. Finally, the term "operational window" is used to refer to the tolerance of the algorithm used to perform interferometric analysis of the correlogram generated by a scan; that is, the range of phase (or OPD) deviation from the nominal algorithm requirement that can be tolerated at each scanning step to produce meaningful results.

The invention may be implemented utilizing any conventional interferometric profiler, preferably including a reference-signal channel for measurement precision. Accordingly, the terms "vertical" and "vertical scanning" are used to refer to the direction of scanning motion typically adopted in interferometric systems, but it is understood that the invention could be implemented in any direction and should not be limited to vertical scanning operation because other methods are used in the art to shift fringes.

Figure 4:
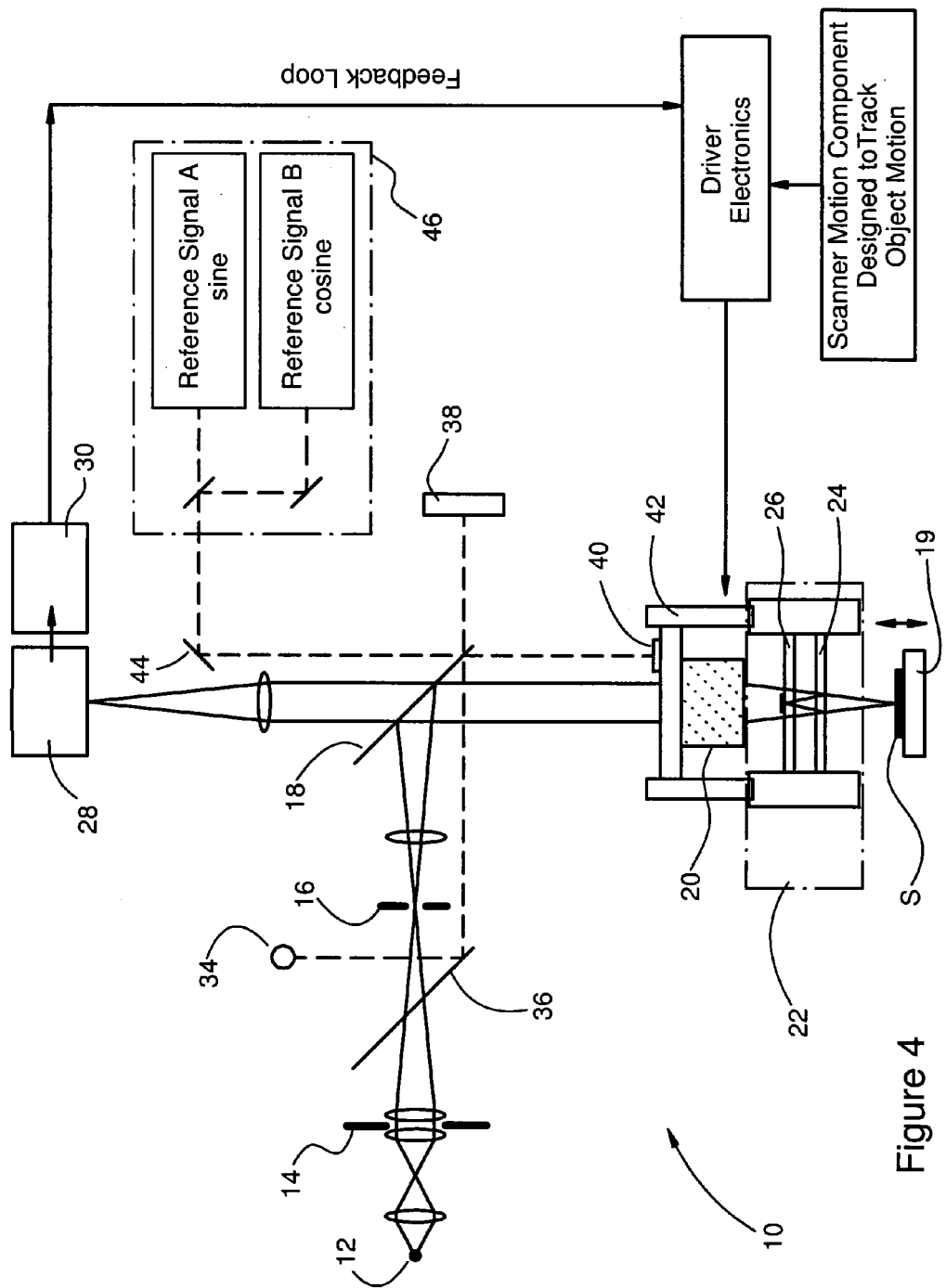
FIG. 4 is a schematic representation of the preferred embodiment of invention based on a conventional interferometric profiler with a reference channel adapted to receive two reference signals in quadrature.

Referring to the drawings, FIG. 4 illustrates schematically an interferometer 10 that includes two reference detectors used to receive two reference signals in quadrature. The interferometer 10 comprises a light source 12 directing a beam of light through an aperture 14 and a field stop 16 toward a beam splitter 18, which reflects the light in the direction of a sample object with a surface S that may experience out-of-plane motion, as defined, with respect to a stage 19. The light reflected by the beam splitter 18 passes through a microscope objective 20 focused on the test surface S. The objective incorporates an interferometer 22, such as Mirau, comprising a beam splitter 24 and a reference mirror 26 in fixed relation to the splitter. The mirror and splitter are adapted for relative movement with respect to the test surface, so that two light beams are generated for producing interference fringes as a result of the optical path difference between the reference mirror 26 and the test surface S.

The beams reflected from the reference mirror 26 and the test surface S pass back up through the beam splitter 18 to a detector array 28 in a camera which is coaxially aligned with the objective 20. Typically, the detector array 28 consists of individual CCD cells or other sensing apparatus adapted to produce a two-dimensional array of digitized intensity data corresponding to light signals received at each sensor cell as a result of interference of the coherent light beams reflected from individual spots on the surface of the sample object and from corresponding spots in the reference mirror 26. Appropriate electronic hardware (not shown) is provided to transmit the digitized interferometric data generated by the detector to a microprocessor 30 for processing. The microscope objective 20 and the interferometer 22 typically integrated with it are adapted for vertical movement to focus the image of the test surface S on the detector array 28.

As detailed in U.S. Publication No. 2002-0196450, an additional reference signal interferometer is preferably built into the conventional measurement channel of the instrument and is dedicated to monitor OPD changes caused by scanner motion through a separate reference-signal channel. The two interferometers can share a significant portion of the profiler's optics (such as the beamsplitter 18 and some lenses), but provide independent signal channels that can be tuned separately without affecting either the measurement path or the reference path. A laser source 34 is used to produce a good-quality reference signal and a beamsplitter 36 is added in the optical measurement path to direct the laser beam towards the main splitter 18. A portion of the light is passed through to a reference mirror 38 dedicated to the reference signal, while the remaining light is reflected towards a mirror or other reflective element 40 (such as a corner cube or a reflecting grating) attached to the moving part of the scanner 42 of the measurement interferometer. Both the reference mirror 38 and the reflector 40 redirect the laser light in reflection towards a reference channel 46 via an additional beam splitter 44. The reference signal is split into two signals A and B shifted by 90 degrees (in software or by optical means), which are then used as reference signals in a conventional synchronous detection technique.

Figure 5:
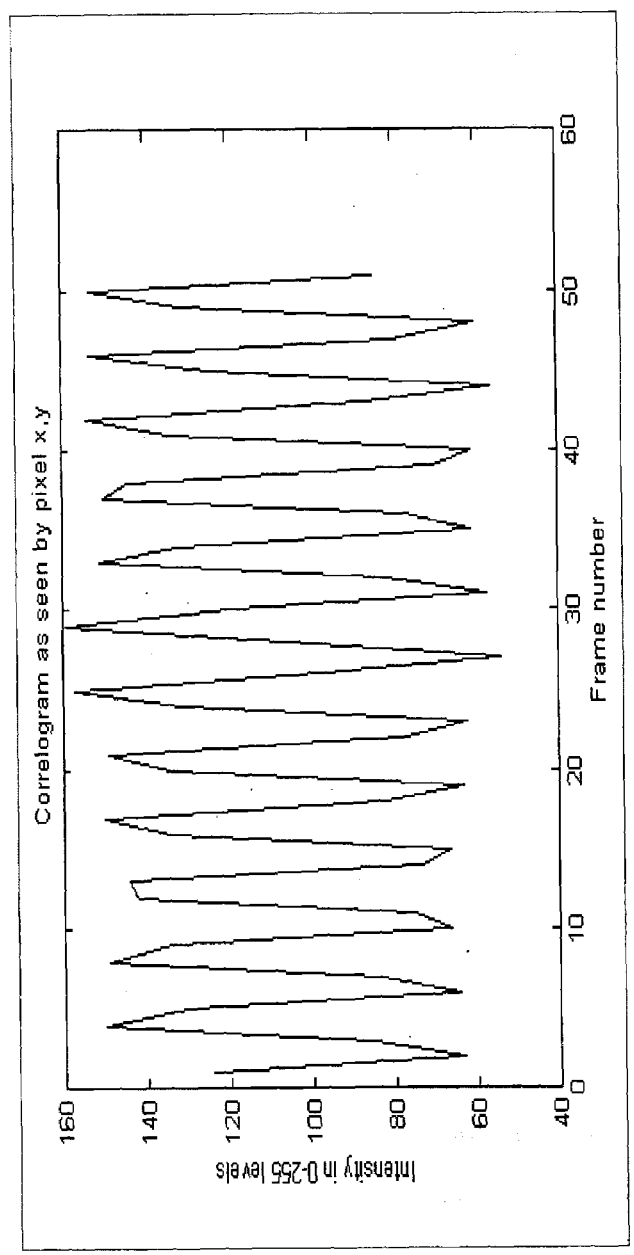
FIG. 5 illustrates the signal observed by a single pixel of a CCD camera during a conventional measurement scan of a static object.
Figure 6:
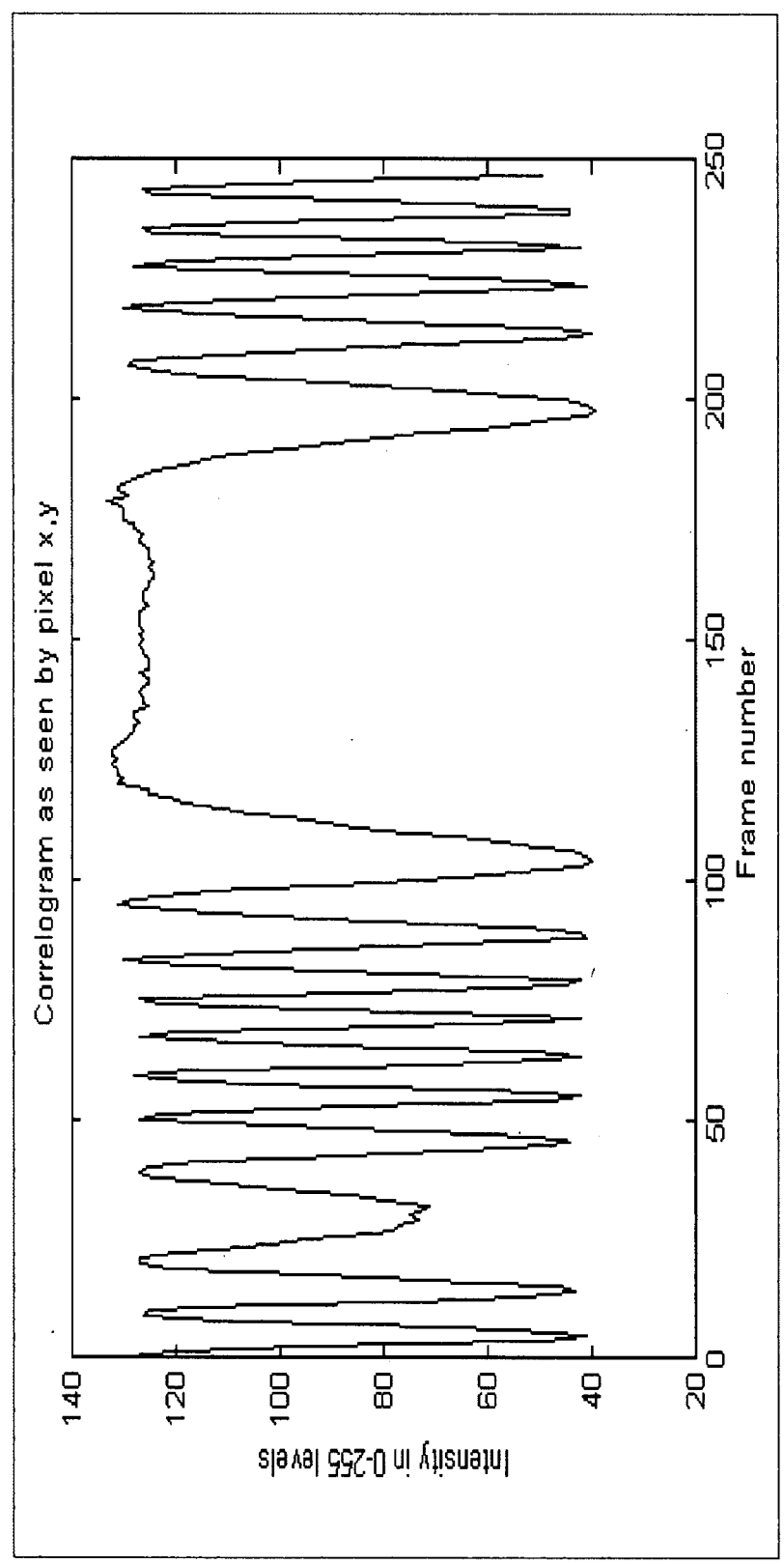
FIG. 6 illustrates the phase-modulated signal observed by a single pixel of a CCD camera during a conventional scan when the object is also being deformed by out-of-plane motion.

When the test object is not subject to observable deformation, because of the nominally constant rate of conventional objective scanning, all pixels of the detector 28 register sampled interference signals that have equal fixed frequencies, as illustrated in FIG. 5, but are shifted in phase with respect to one another due to the shape of the object. During the measurement of a moving object, however, not only will different signals be shifted in phase, but the frequency of each signal produced by a pixel may also be changing due to the variable rate of OPD change caused by the object motion. In addition, the signals received at various CCD pixels may correspond to different phase changes depending on the type of object motion. As a result, each pixel of the CCD camera will generate phase-modulated signals that contain aggregate information about the scanner motion as well as the object motion, as illustrated in FIG. 6.

Figure 1:
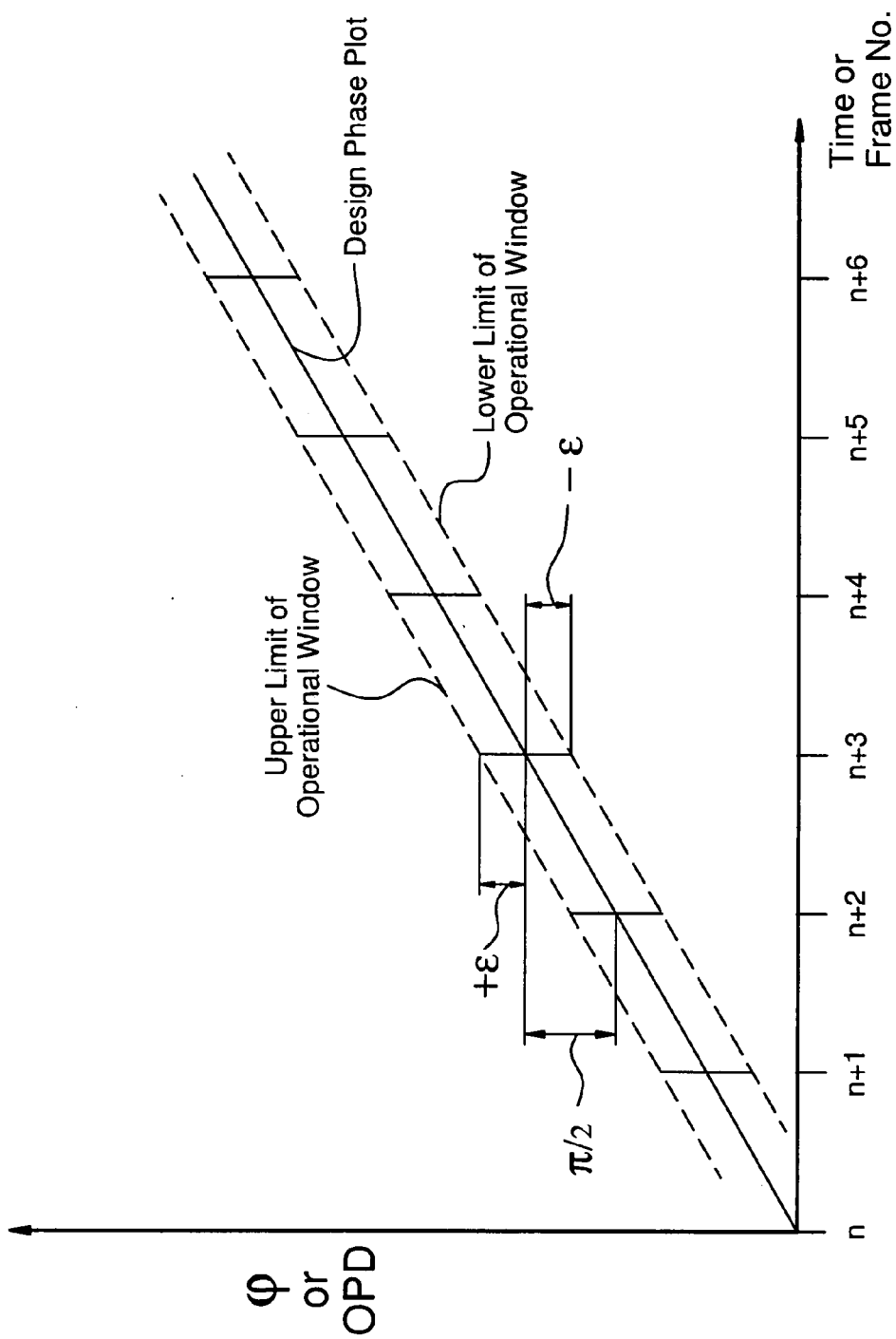
FIG. 1 is a phase-versus-time plot illustrating the operational window of a conventional phase-step calculation algorithm used in optical profiling.
Figure 2:
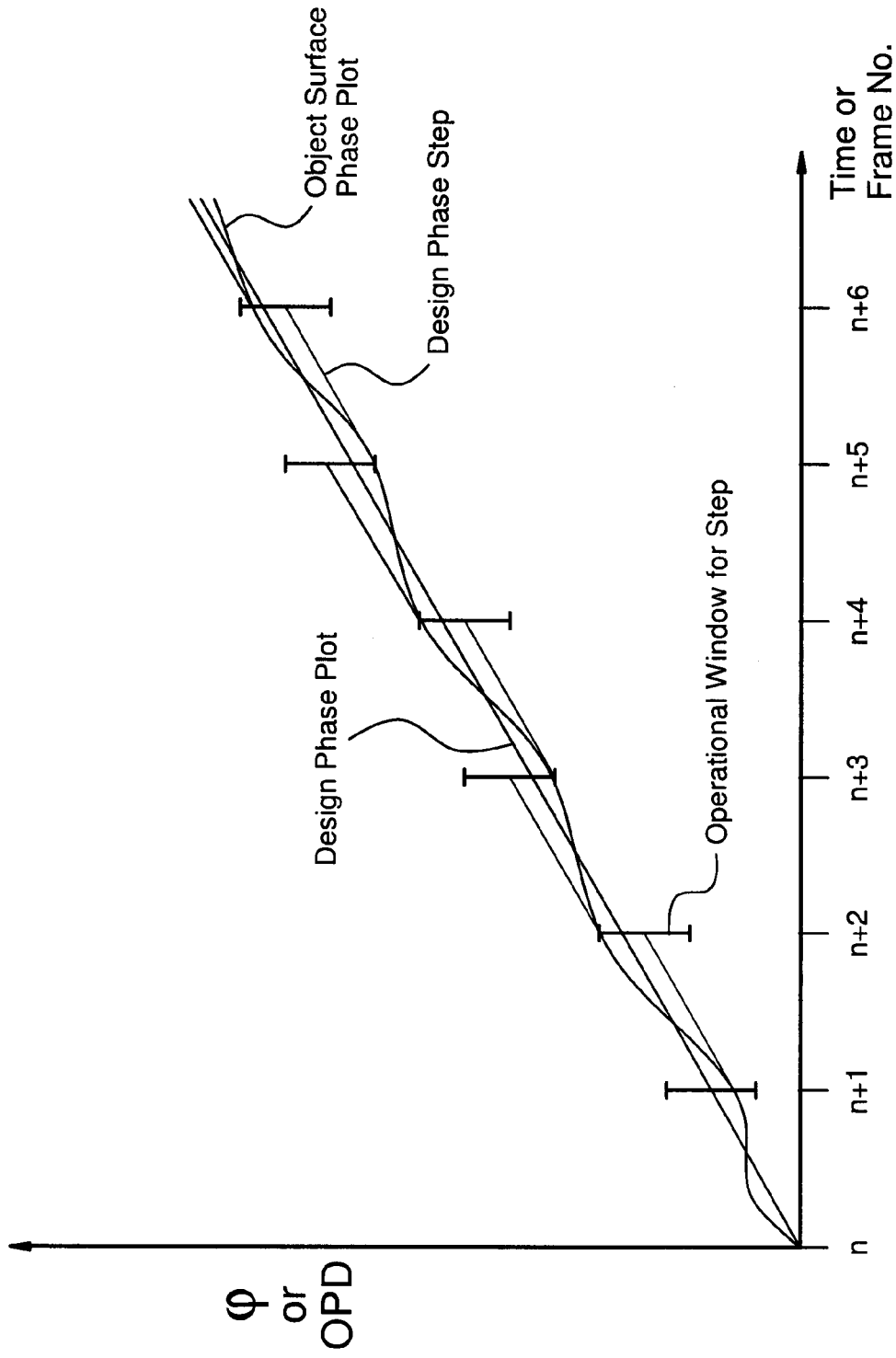
FIG. 2 illustrates the phase plot for a harmonically moving object which can be resolved with the calculation algorithm of FIG. 1.
Figure 3:
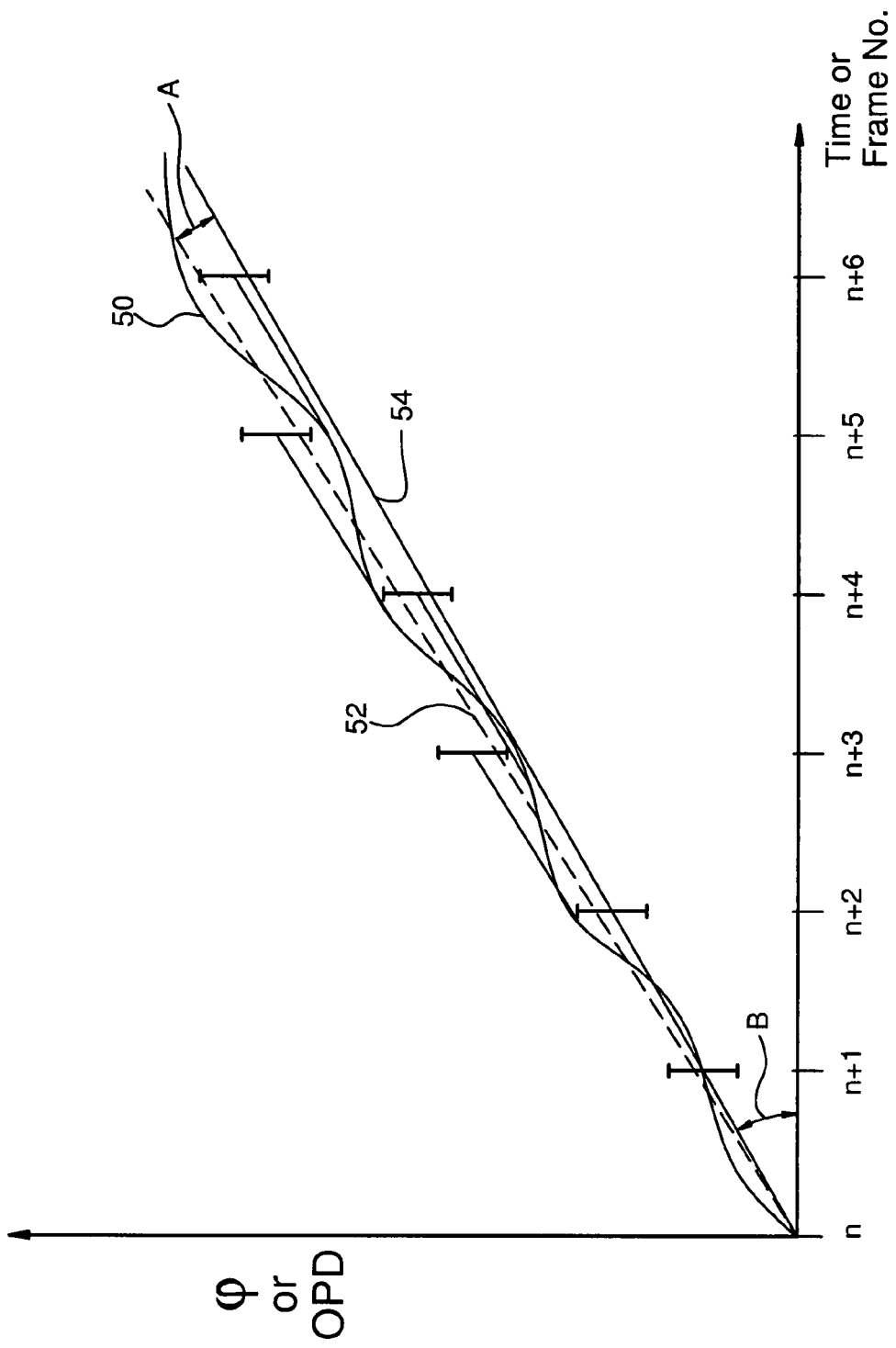
FIG. 3 illustrates the phase plot for an object with a complex motion that cannot be resolved with the calculation algorithm of FIG. 1.

According to the invention, as shown in FIG. 4, the scanner motion is modified by providing a signal that produces a phase step that approximates the phase change expected to be measured at each pixel between acquisition frames. As a result, the phase change is kept within the operational window of the algorithm used for interferometric analysis and the object motion can be recovered from the interferograms generated by a single measurement scan. In its simplest form, the invention involves subtracting a linear phase change to the nominal frequency carrier of the scanner so as to approximate linear components present in the object motion. Referring, for example, to FIG. 3, it is clear that the object motion is characterized by a periodic component 50 superimposed over a linear component 52 that corresponds to the linear displacement of a point on the object surface with respect to the scanner, which in turn is moving according to the nominal phase plot 54. Thus, for a single pixel the object's linear-motion component is represented by a straight-line phase plot 52 with a slope A (with respect to the scanner motion 54) equal to the rate of linear phase change produced by the object motion. Accordingly, ignoring scanning errors for convenience of illustration, the actual phase measured by the system during a scan is determined by the OPD produced by the cumulative effect of the scanner's nominal motion and the object's total motion (linear and periodic, as represented by the phase plot 50 in the figure). The linear component of the object motion in effect increases the slope of the phase plot over the slope B of the nominal scanner phase plot 54 by an amount equal to the slope A of the phase plot 52 produced by the linear component of object motion.

Figure 7:
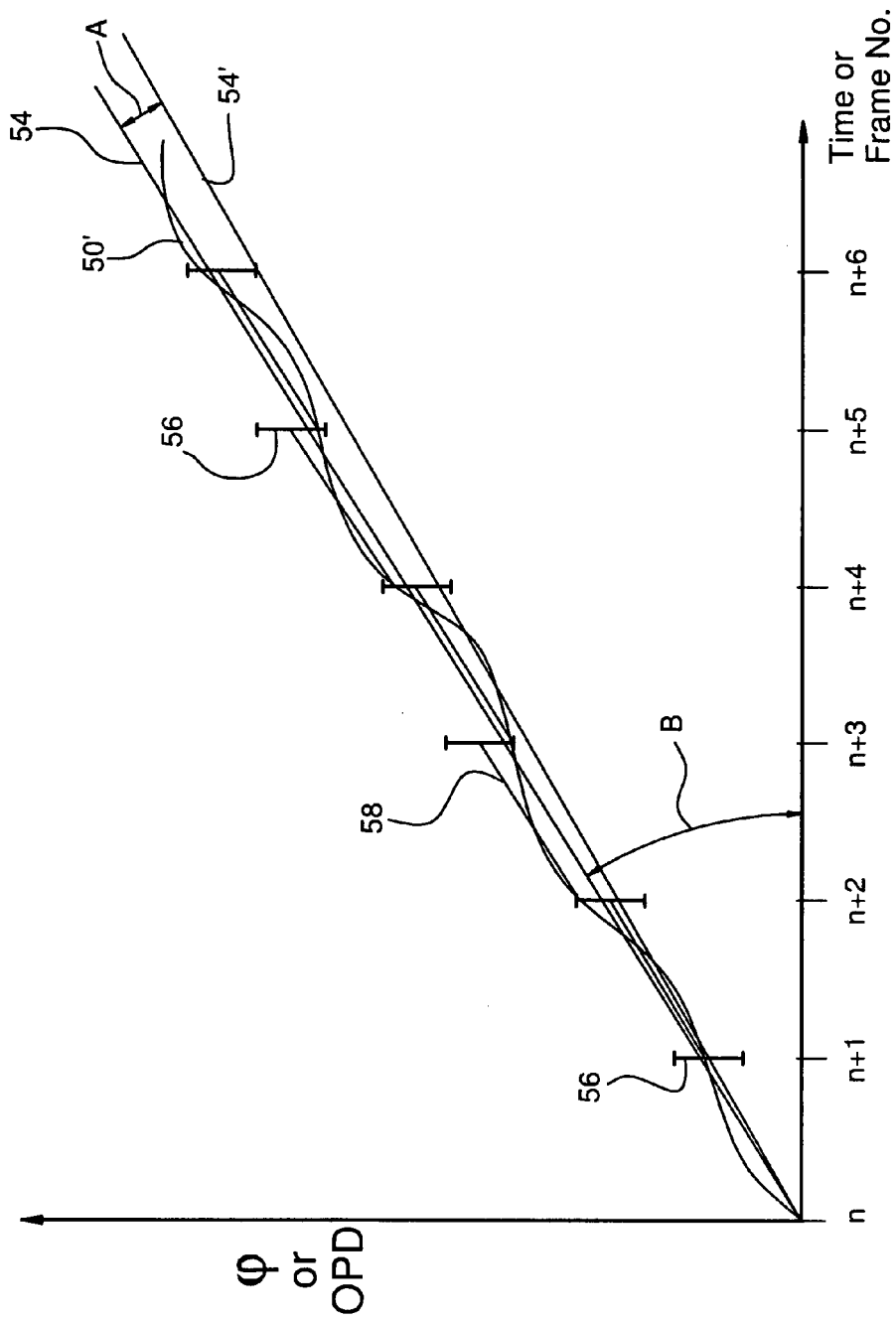
FIG. 7 illustrates the phase plots generated by a scan of a pixel on an object moving with a periodic and a linear component and of a scanner wherein the motion of the scanner is modified by subtracting a linear component designed to equal the linear displacement of the object.

If a linear component with slope A is subtracted from the nominal scanner motion 54, as shown in FIG. 7, the difference between the modified scanner motion 54' and the object motion is reduced to the periodic component of the object motion. Accordingly, as illustrated, the phase change between acquisition frames produced by the object motion (curve 50', corresponding to the original curve 50 shifted downward by an amount equal to the slope A of the linear component of the object motion) remains at each frame within the operational window 56 of the design phase step 58 of the algorithm used to compute phase throughout the scan. Thus, interferometric measurements become possible and the motion of the corresponding pixel on the object surface can be measured simply by tracking its phase change of the object (plot 50') and subtracting from it the modified phase plot 54' of the scanner. This situation could correspond, for example, to the out-of-plane motion of a periodically oscillating micro-platform used as an external mirror in a tunable laser diode system.

Figure 8:
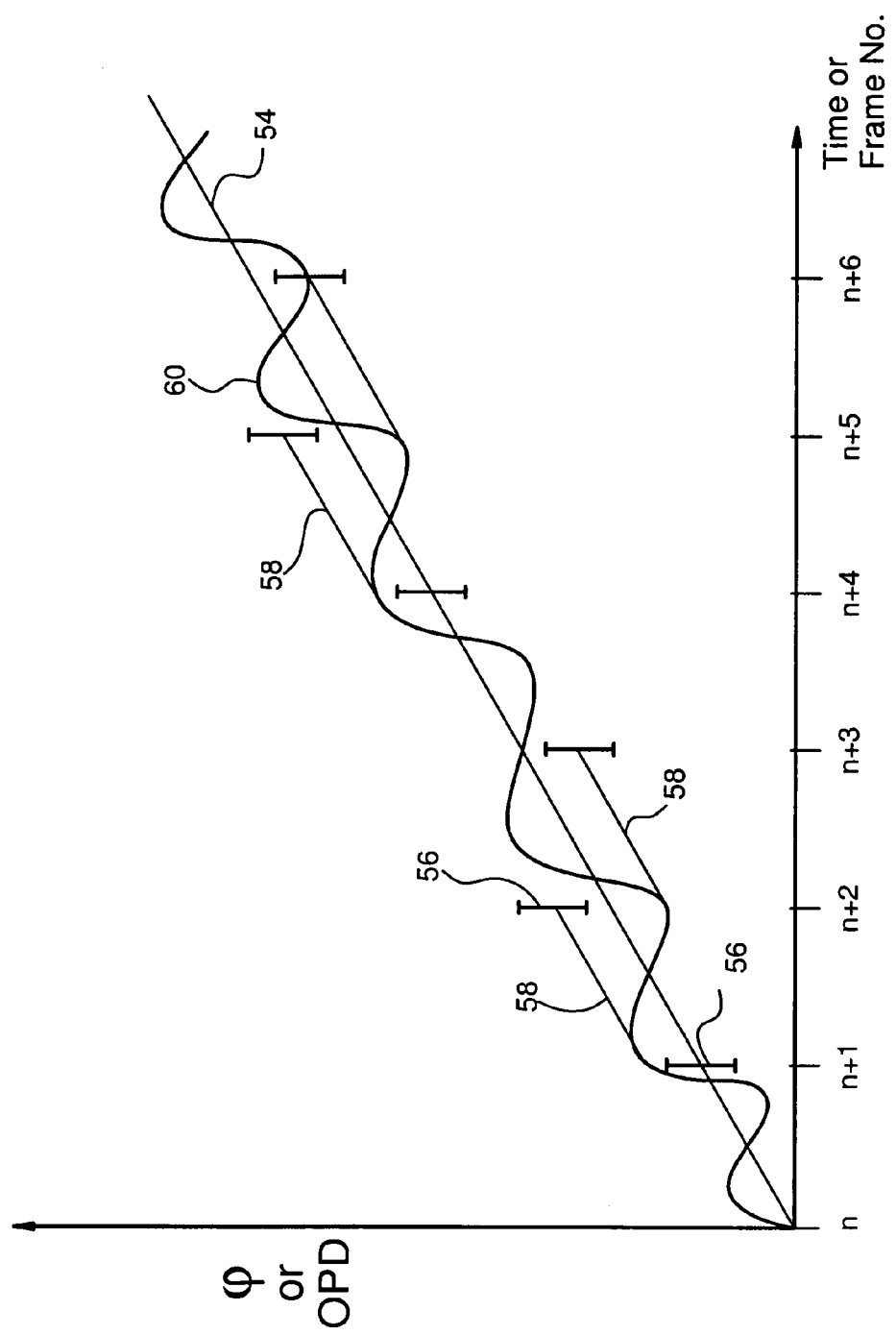
FIG. 8 illustrates the phase plots of an object's pixel moving with a periodic motion and a scanner moving at its nominal phase-step rate.
Figure 9:
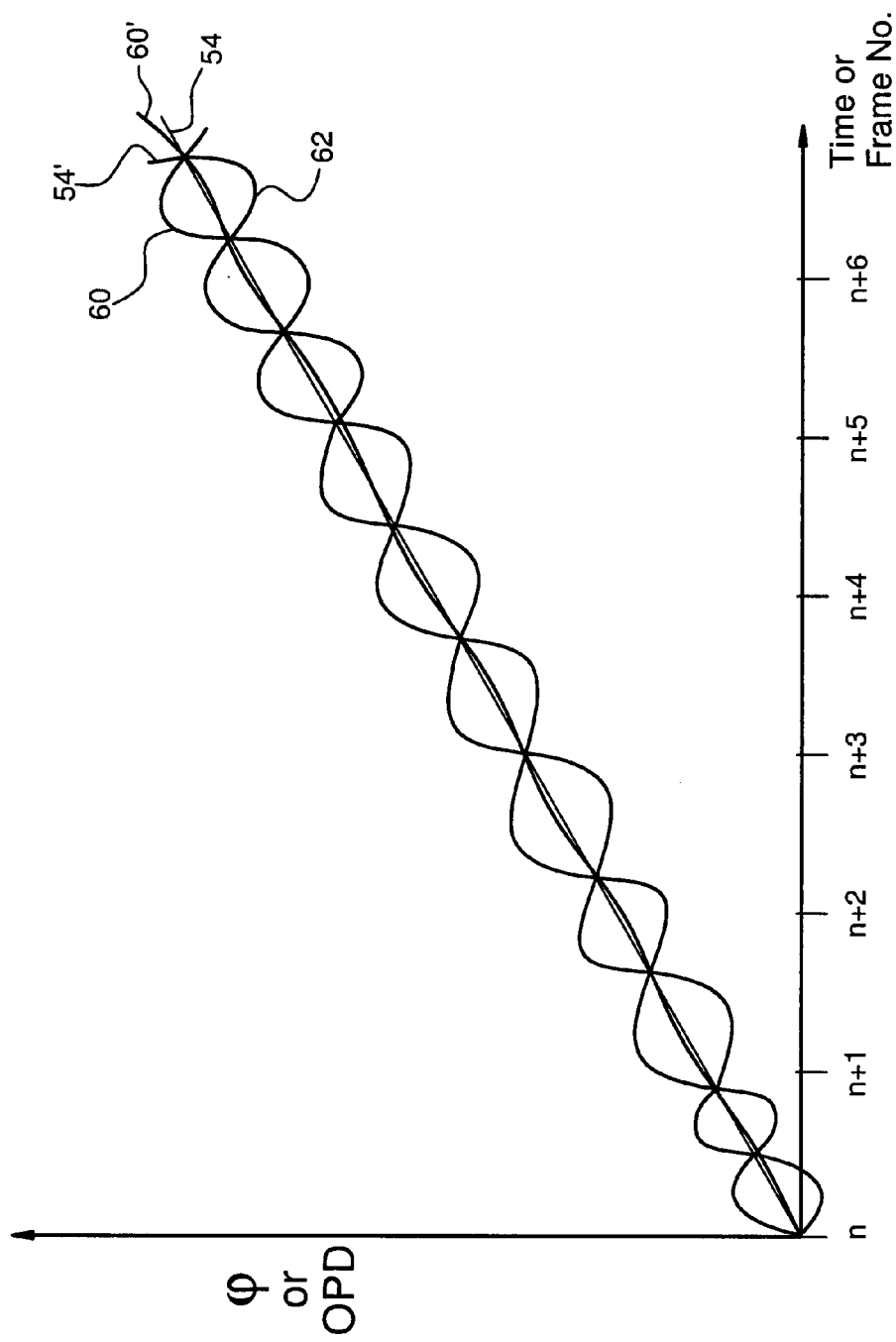
FIG. 9 illustrates the phase plots produced by the scanner of FIG. 8 after a periodic motion substantially equal to the object motion is subtracted from the scanner's nominal motion.

In a more complex embodiment of the invention, particularly suitable for measuring object motions of a quasi-periodic nature, a periodic component is combined with the nominal scanner motion in order to track approximately the object deformation. If the object moves in harmonic fashion with an amplitude and a frequency that are incompatible with the operating parameters of the algorithm used for interferometric analysis, such as illustrated by curve 60 in FIG. 8, a simply linear adjustment to the scanner motion will not suffice. Accordingly, a similar harmonic component 62, but opposite in amplitude sign, is added to the nominal motion of the scanner (represented by the phase plot 54) in order to produce a modified scanner motion (corresponding to phase plot 54') designed to maintain the scan within the algorithms's operational window throughout the scan. As a result, the phase plot 60' produced by the object will nearly track the nominal phase plot 54 of the scanner at each acquisition step, as shown in FIG. 9, and the object motion can be measured by interferometric analysis with the fringe data acquired during a scan.

Figure 10:
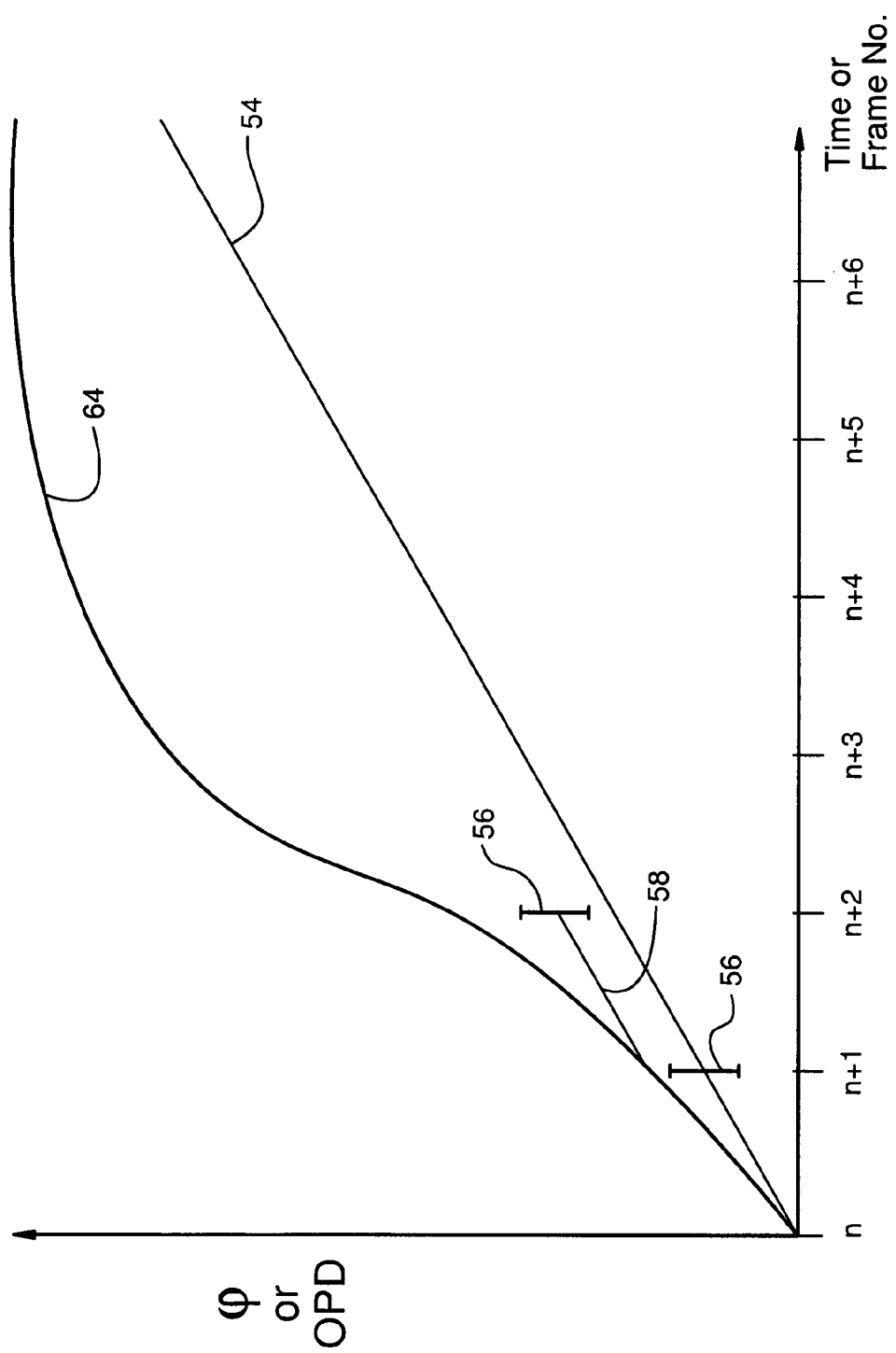
FIG. 10 illustrates the phase plots of an object's pixel moving with a generic nonlinear motion and a scanner moving at its nominal phase-step rate.
Figure 11:
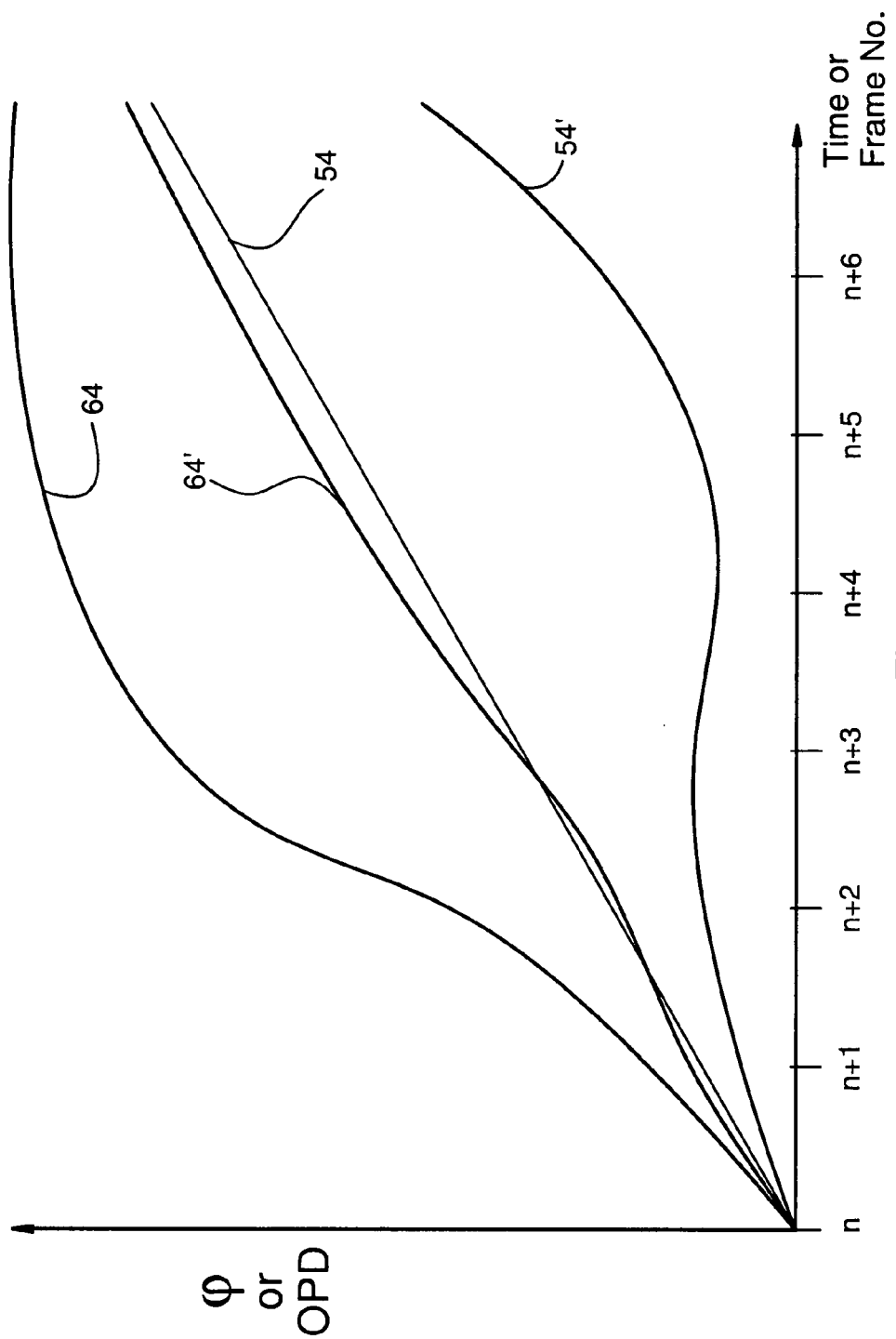
FIG. 11 illustrates the phase plots produced by the scanner of FIG. 10 after substantially the same nonlinear motion of the object is subtracted from the scanner's nominal motion.

Thus, in a most general sense, the invention consists of estimating the object motion and then modifying the nominal scanner motion by subtracting the object motion estimate from it with the objective of producing object phase changes within the operational window of the analytical algorithm at each scanning step. For example, if the object moves in an undefined nonlinear fashion clearly outside the operational window of the algorithm, such as illustrated by the phase plot 64 in FIG. 10, the object motion may be approximated with a polynomial or other suitable fit. As shown in FIG. 11, such approximation then would be subtracted from the nominal scanner motion (represented by the phase plot 54) to produce a modified scanner motion (plot 54') that in turn yields an object phase plot 64' that is within the operational window of the system. As a result, the object motion can be measured by interferometric analysis with the fringe data acquired during a scan.

Once the motion of the scanner is corrected according to the invention to produce reliable interferometric data, the motion of the test object can be extracted from the measurements in straightforward manner. Assuming ideal behavior, the position of the scanner is known at each acquisition frame (by its nominal rate of motion and the additional know components superimposed according to the invention), thereby enabling a determination of object deformation at each frame simply by calculating the difference between the object position (as measured by the cumulative phase evolution during the scan) and the corresponding scanner position.

Figure 12A:
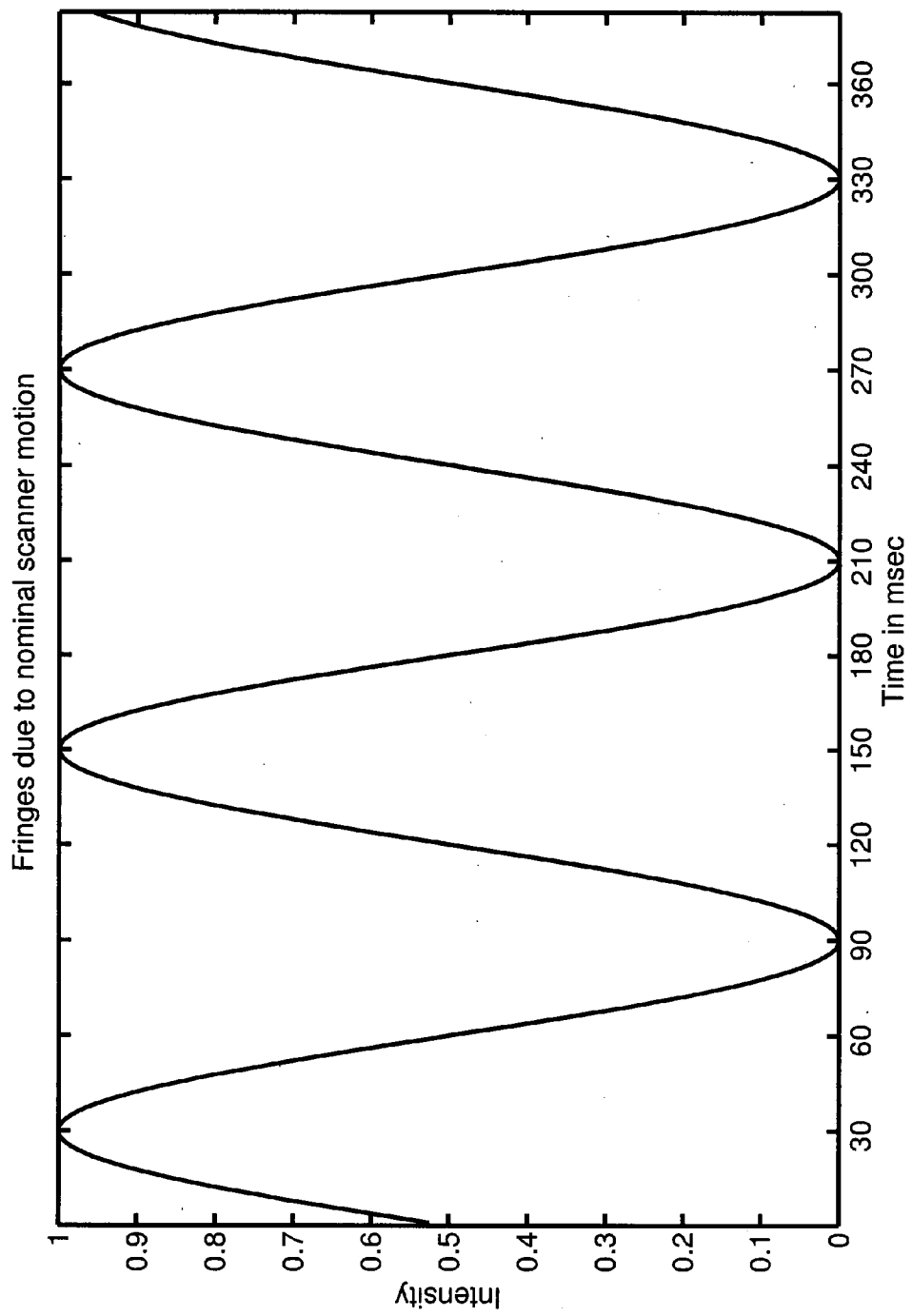
FIGS. 12A-12F illustrate the invention in a case where the scanner motion was modified by superimposing a quadratic component to track a hypothetical, substantially quadratic, out-of-plane motion of the object surface.
Figure 12B:
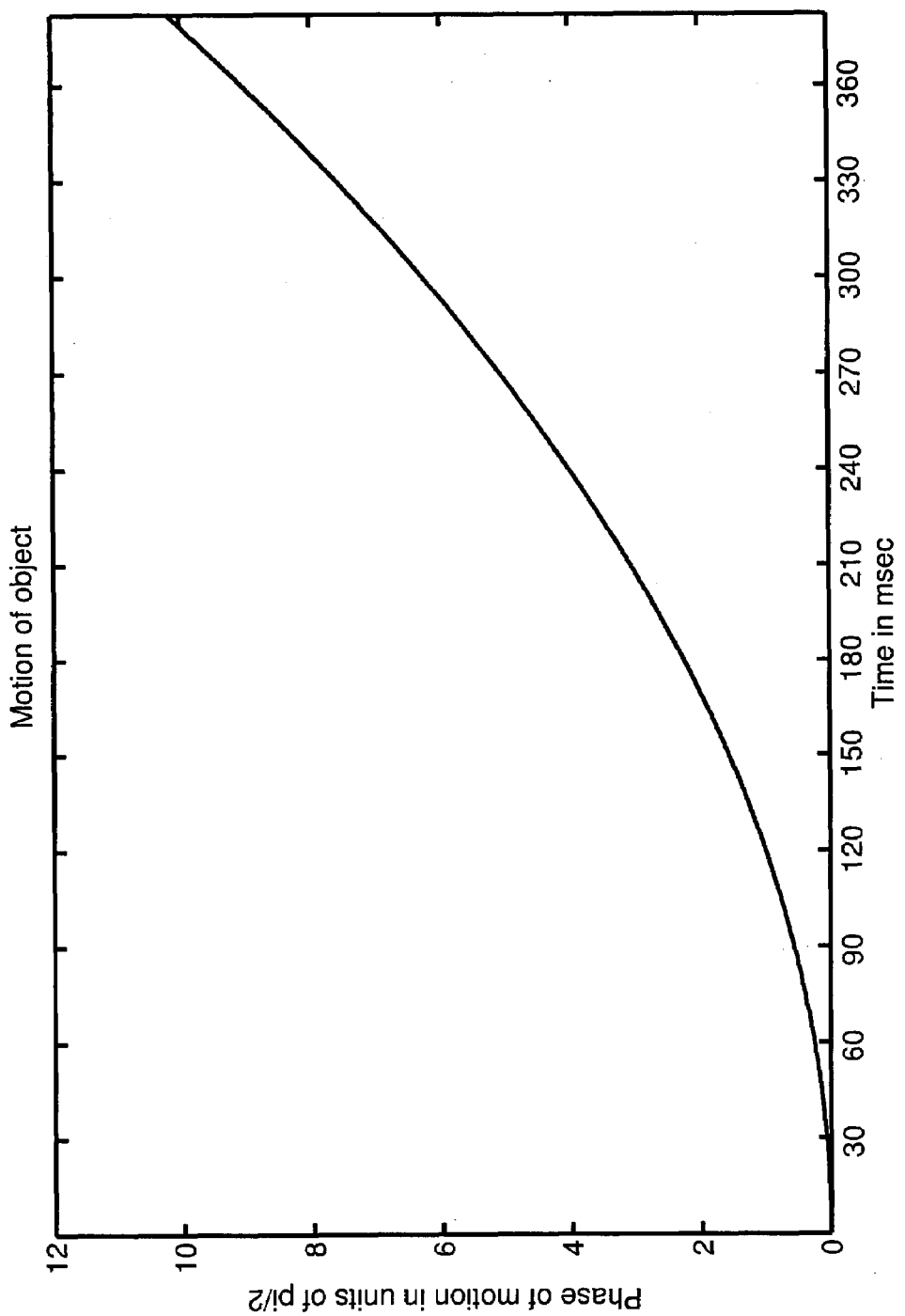
Figure 12C:
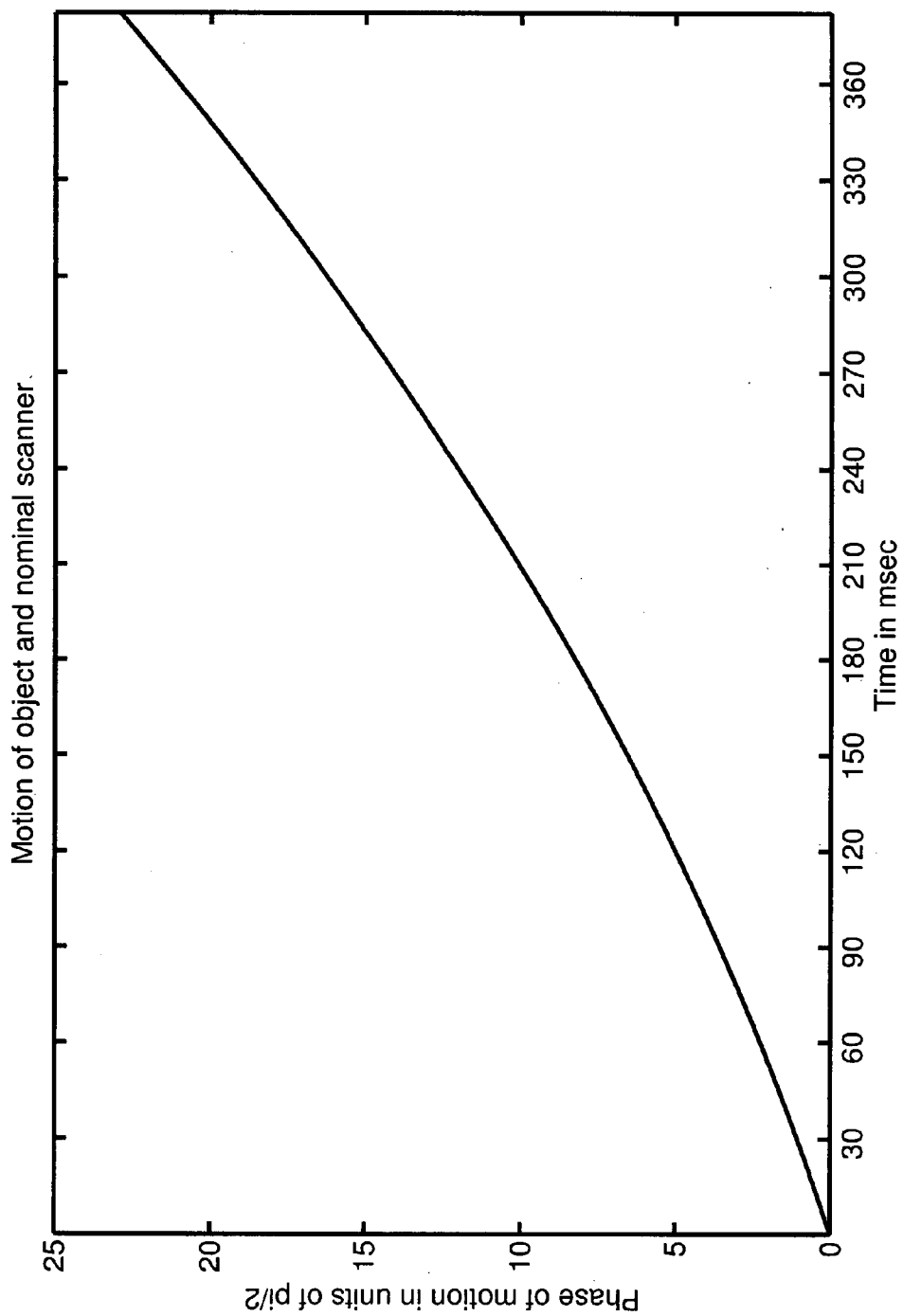
Figure 12D:
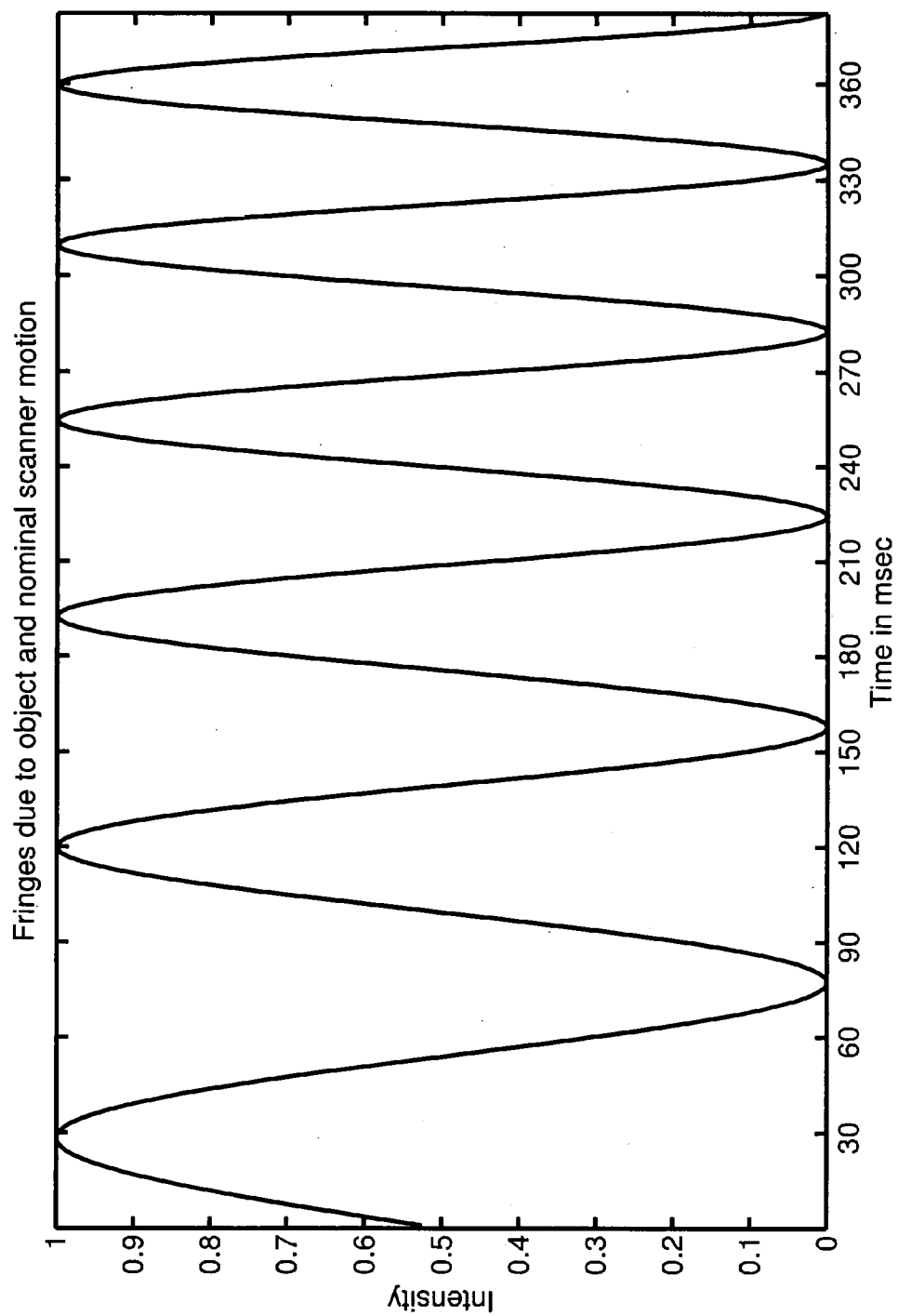
Figure 12E:
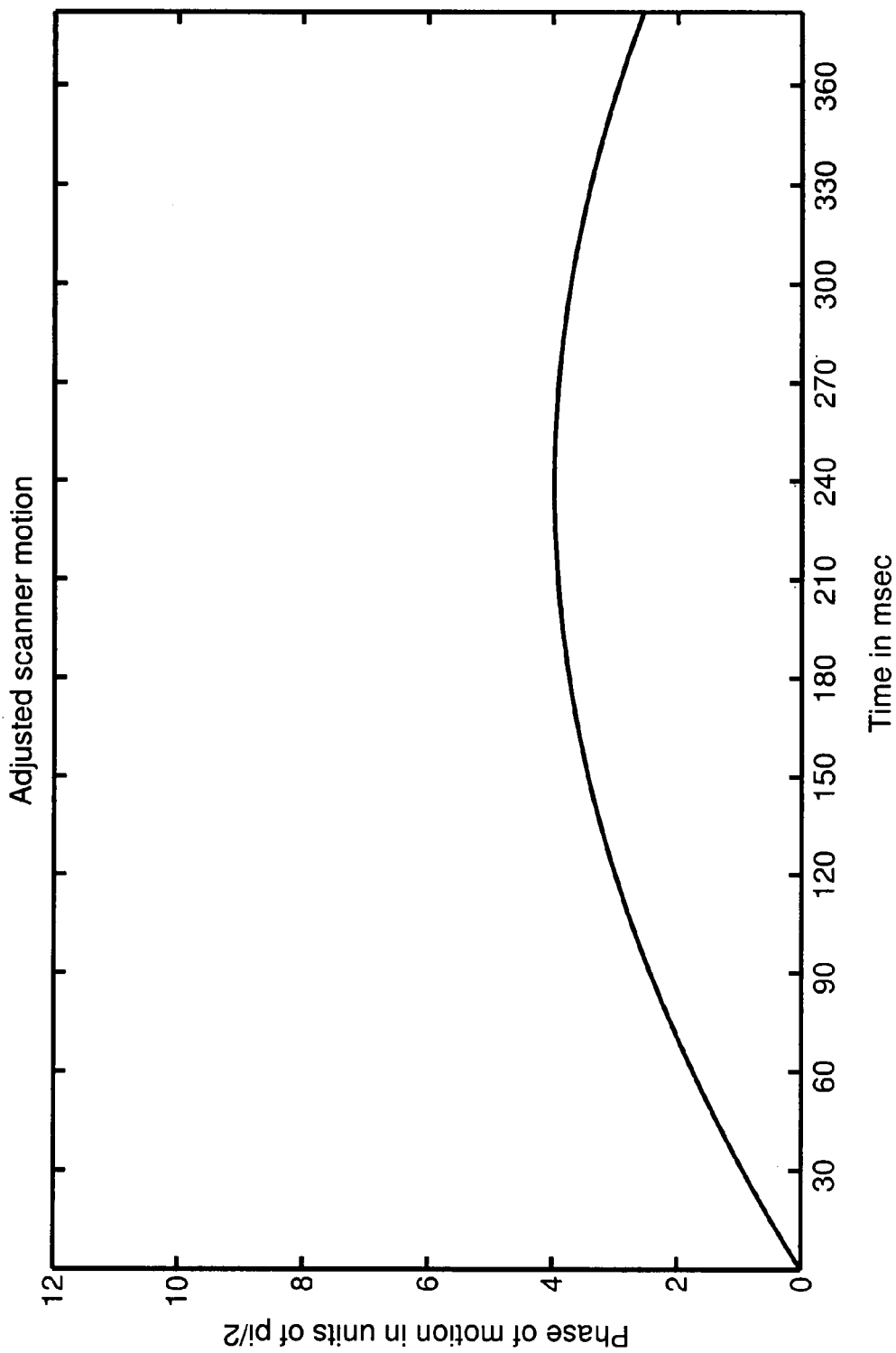
Figure 12F:
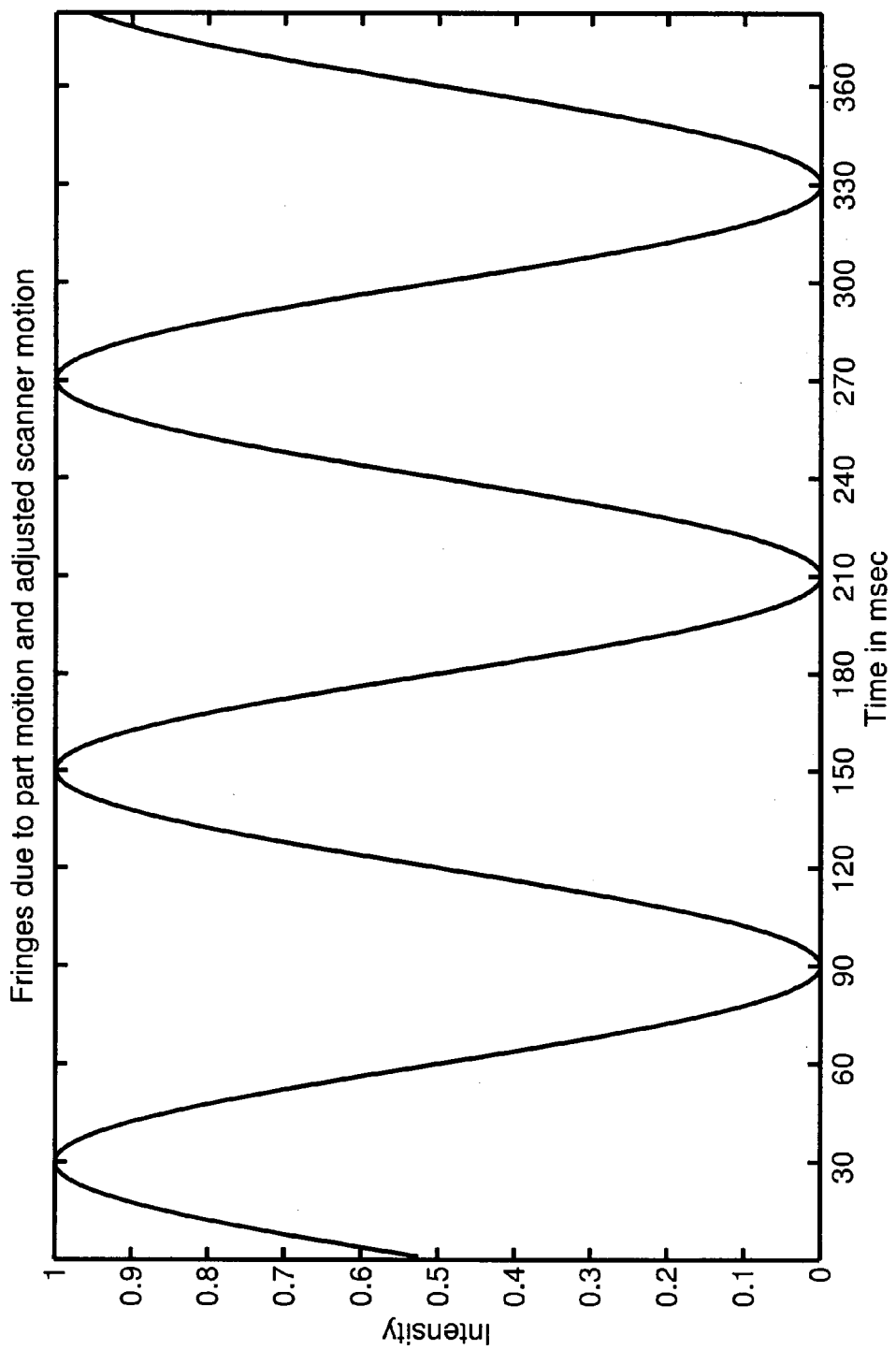

FIGS. 12A-12F illustrate the invention in a case where the scanner motion was modified by superimposing a quadratic component to track a hypothetical, substantially quadratic, out-of-plane motion of the object surface. FIG. 12A shows the monochromatic correlogram observed by a single pixel of a CCD camera during a conventional measurement scan while the object was static (i.e., the correlogram produced by the scanner's nominal motion). FIG. 12B shows the quadratic out-of-plane motion of the object (measured in terms of phase or OPD change). FIG. 12C shows the phase variation observed as a result of the object and nominal scanner motion. FIG. 12D shows the effect of the object motion on the correlogram of FIG. 12A, illustrating the fact that the frequency of the fringes becomes clearly outside the phase-step parameters required for interferometric analysis as the object moves more rapidly upwards in quadratic fashion. FIG. 12E illustrates the phase plot produced by the adjusted scanner motion obtained by subtracting a quadratic component approximating the object motion from the nominal motion of the scanner. Finally, FIG. 12F shows the correlogram produced by the combination of the object motion and the adjusted scanner motion according to the invention. The figure demonstrates that the scan produced a correlogram with periodic fringes substantially equal to the static correlogram of FIG. 12A. Accordingly, the object motion can be correctly derived from the scan.

Figure 13A:
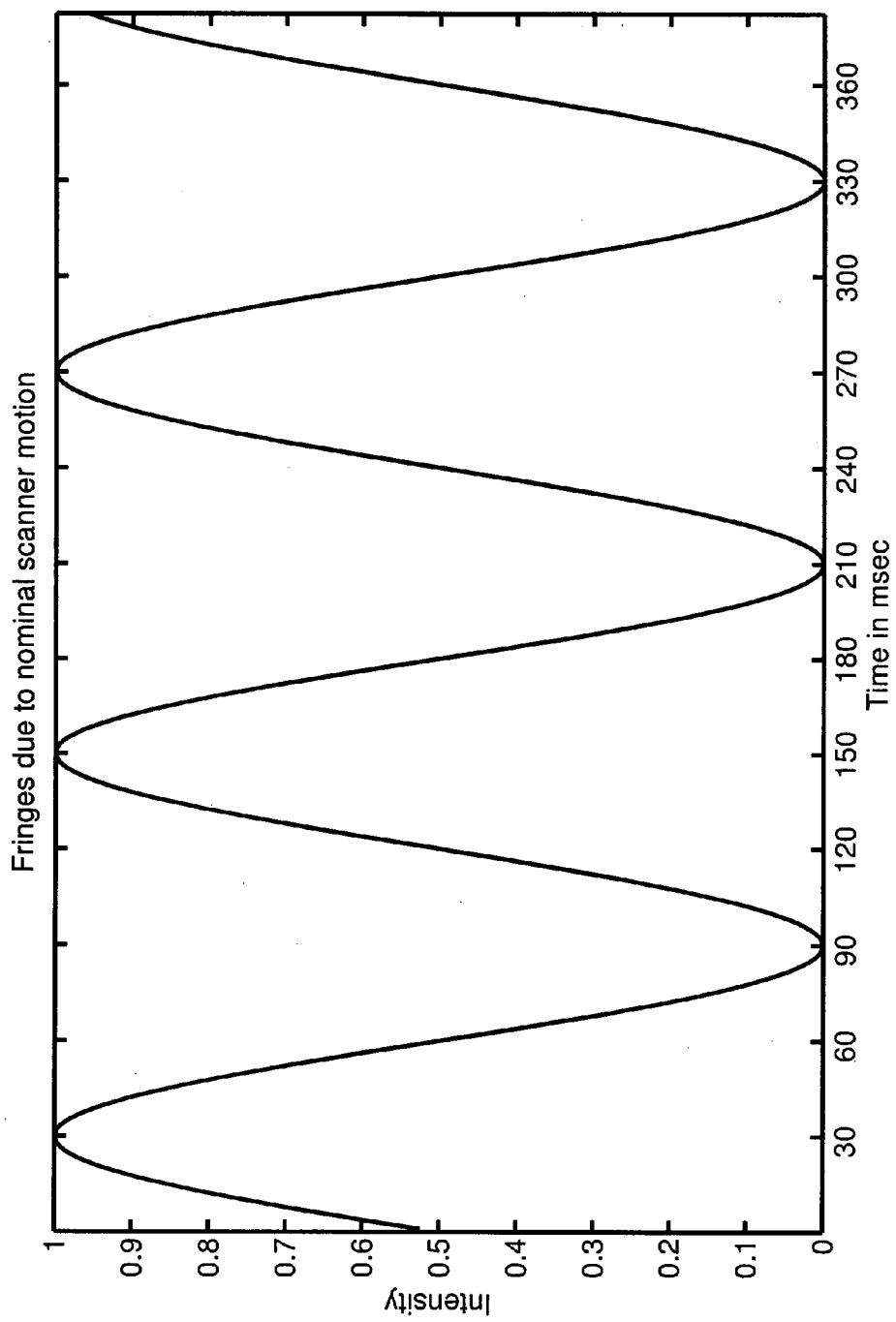
FIGS. 13A-13F illustrate the invention in a case where the scanner motion was modified by superimposing a sinusoidal component to track a hypothetical, substantially sinusoidal, out-of-plane motion of the object surface.
Figure 13B:
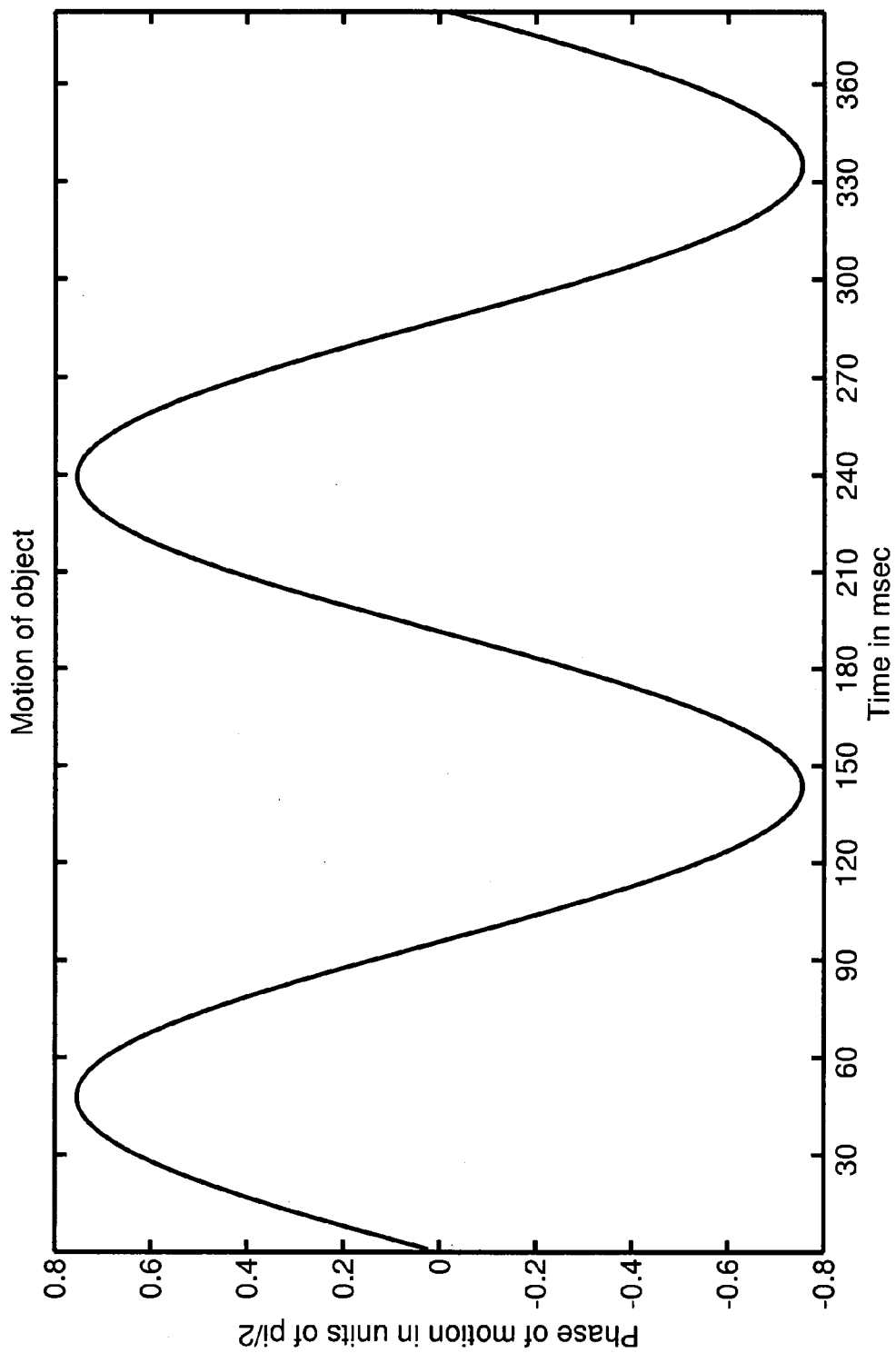
Figure 13C:
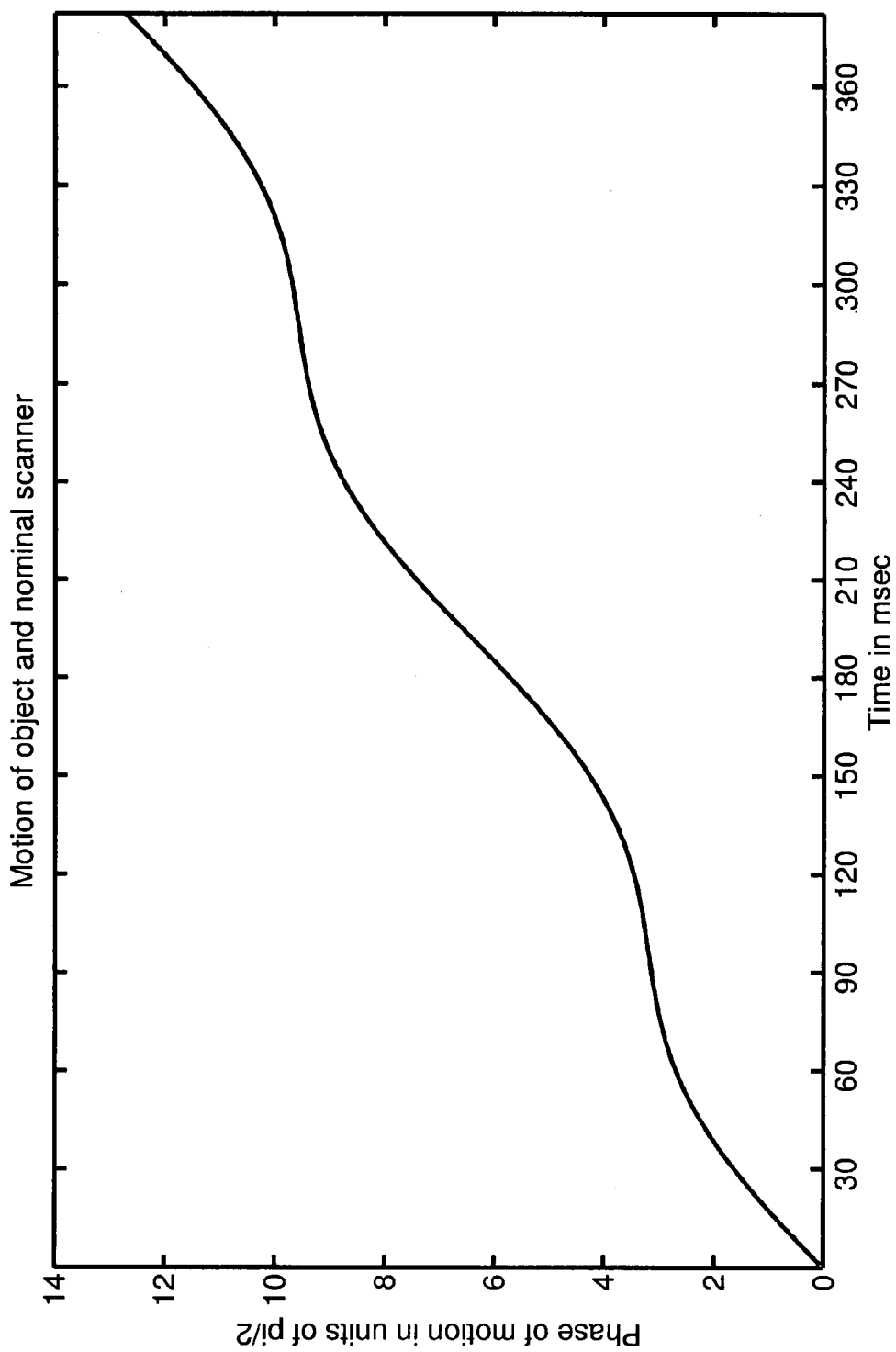
Figure 13D:
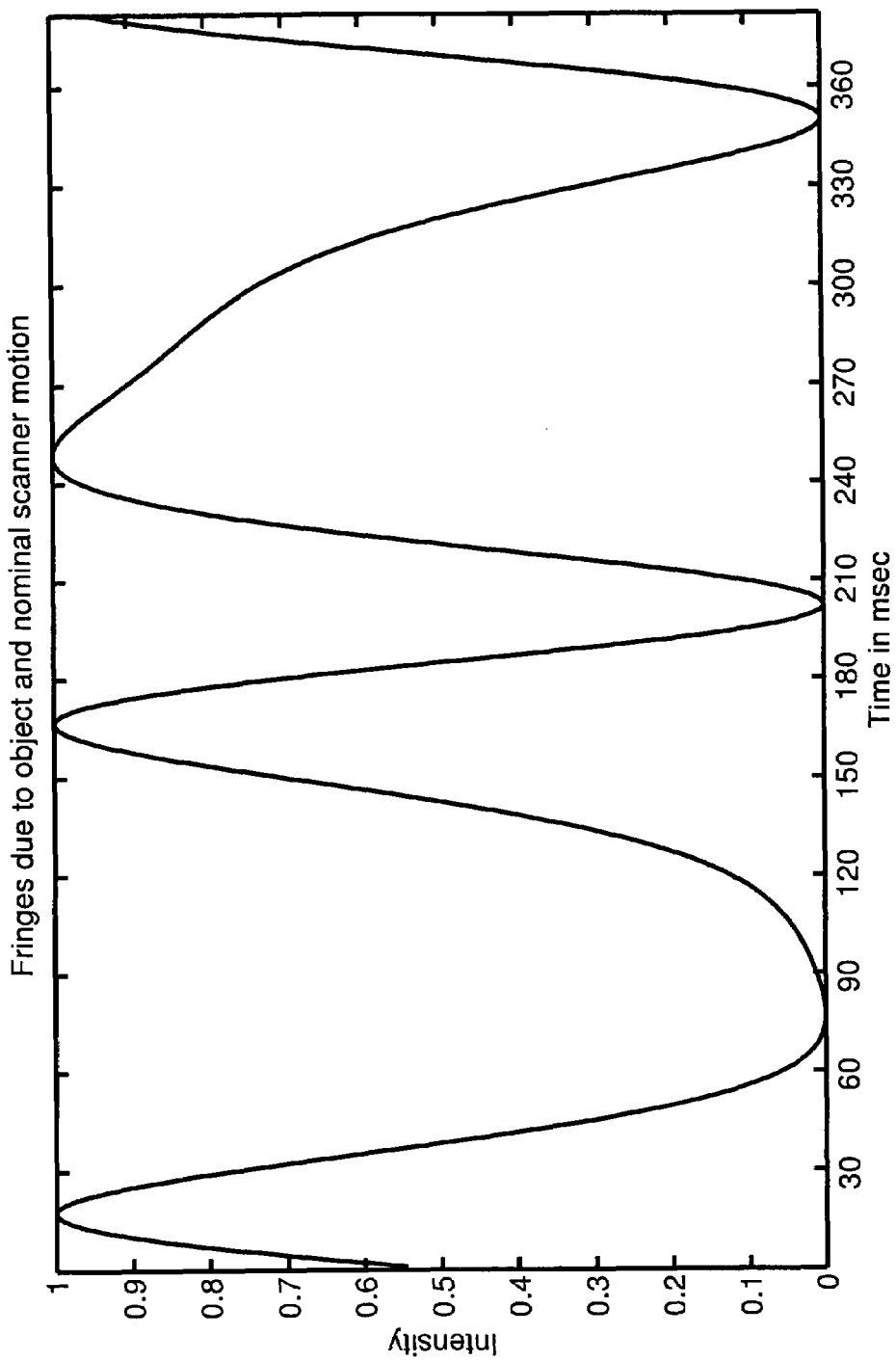
Figure 13E:
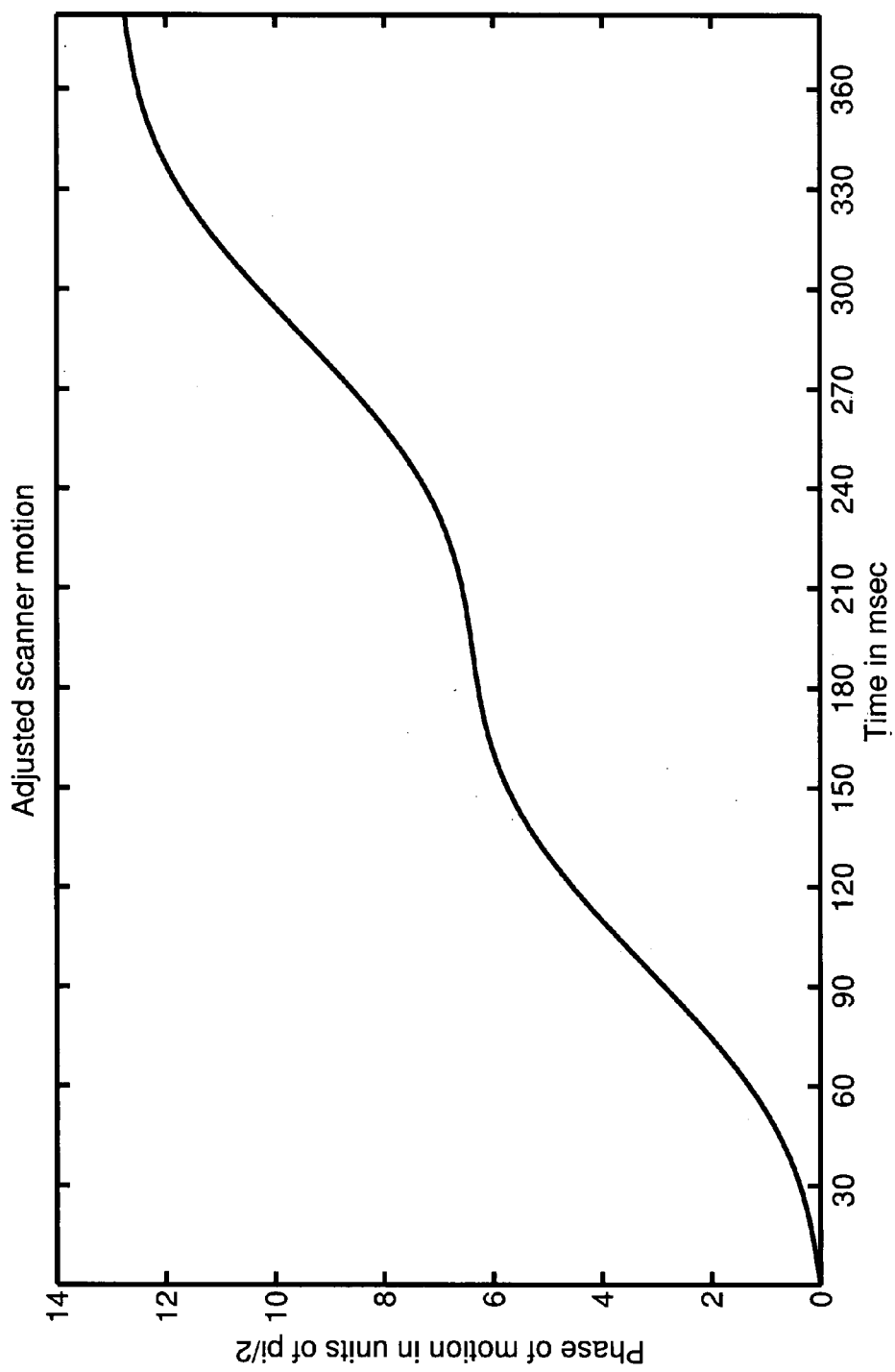
Figure 13F:
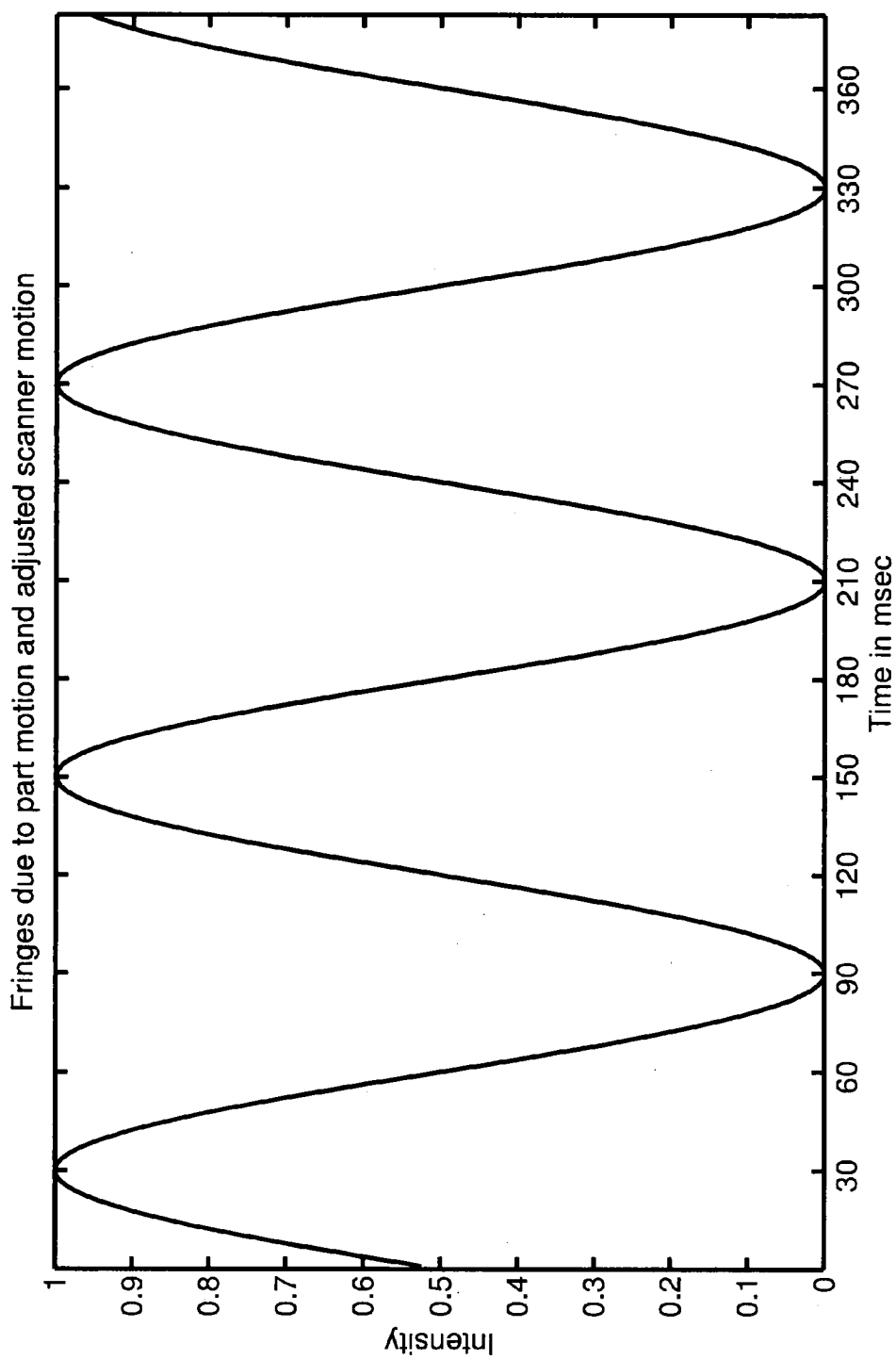

In another example, FIGS. 13A-13F similarly illustrate the invention with an object characterized by a hypothetical, substantially sinusoidal out-of-plane motion. FIG. 13A shows the monochromatic correlogram observed by a single pixel of a CCD camera during a conventional measurement scan while the object was static (again, the correlogram produced by the scanner's nominal motion). FIG. 13B shows the sinusoidal out-of-plane motion of the object (measured in terms of phase or OPD change). FIG. 13C shows the phase variation observed as a result of the object and nominal scanner motion. FIG. 13D shows the effect of object motion on the correlogram of FIG. 13A, illustrating the fact that the frequency of the fringes becomes clearly outside the phase-step parameters required for interferometric analysis as the object moves along the peaks and valleys of the sinusoidal cycle. FIG. 13E illustrates the phase plot produced by the adjusted scanner motion obtained by subtracting a sinusoidal component approximating the object motion from the nominal motion of the scanner. Finally, FIG. 13F shows the correlogram produced by the combination of the object motion and the adjusted scanner motion according to the invention. The figure demonstrates that the scan produced a correlogram with periodic fringes is substantially equal to the static correlogram of FIG. 13A. Accordingly, the object motion can be correctly derived from the scan.

It is noted that the invention has been described in terms of an interferometric device wherein the scanner motion is modified to track the object's out-of-plane motion, but one skilled in the art would readily appreciate that it could be implemented in other ways. The important feature is the idea of appropriately modifying either the scanning motion or some other element in the interferometric system to force the phase change (or the fringe shift, as applicable) between scanning steps (or acquisition frames, when scanning is not part of the system) to be within the operational window of the algorithms used for interferometric analysis. For example, the same could be achieved by moving the reference mirror or the sample stage. Similarly, the OPD change (i.e., the phase change) produced between steps or acquisition frames could be maintained substantially constant utilizing other techniques, such as the use of adaptive optics or spatial light modulators applied to the reference surface of the interferometer.

Figure 14A:
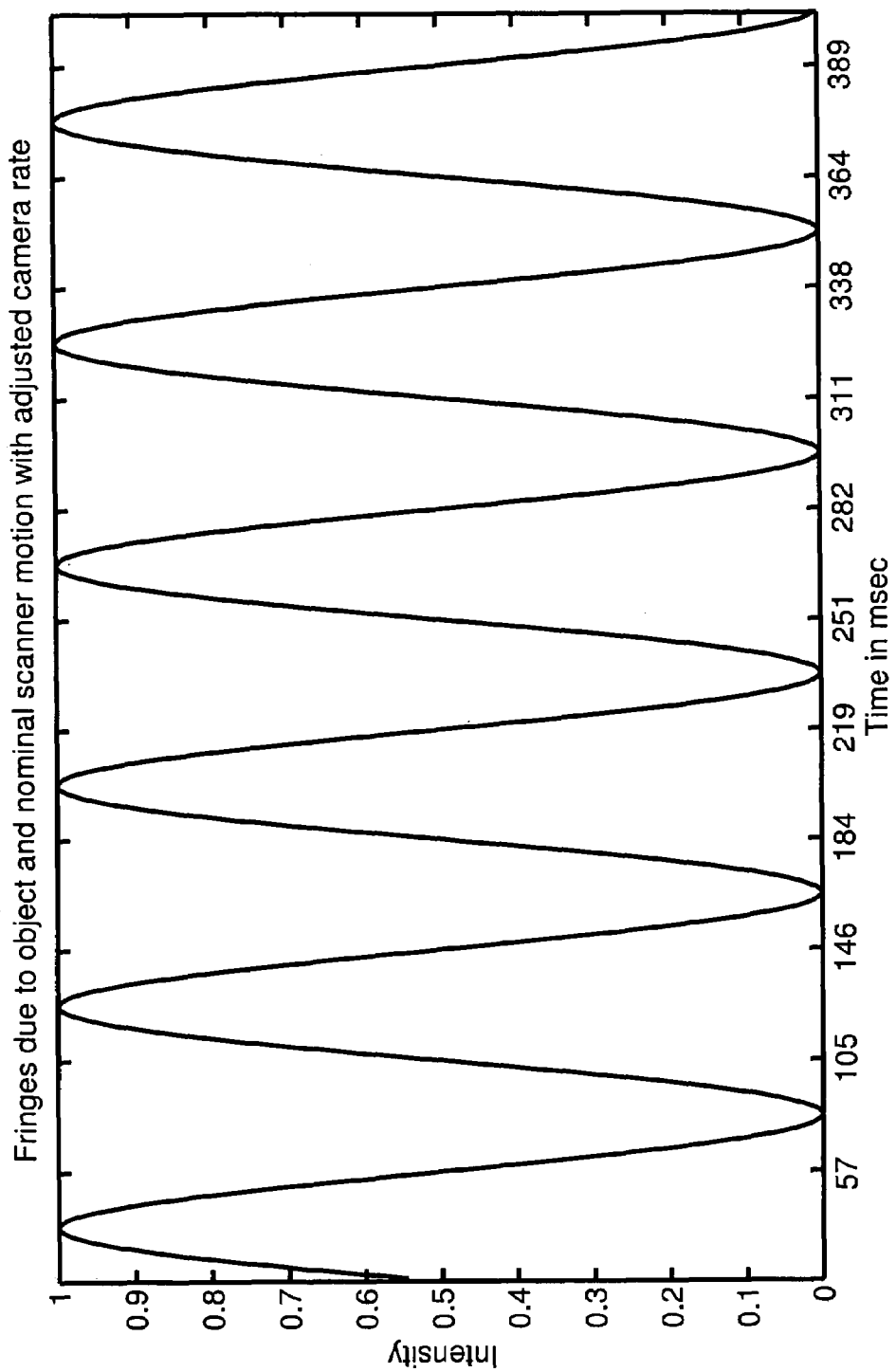
FIG. 14A is a correlogram corresponding to the example of FIG. 12 wherein the time intervals between acquisition frames, rather than the scanning steps, are varied to keep the phase change between frames within the operational window of the algorith.
Figure 14B:
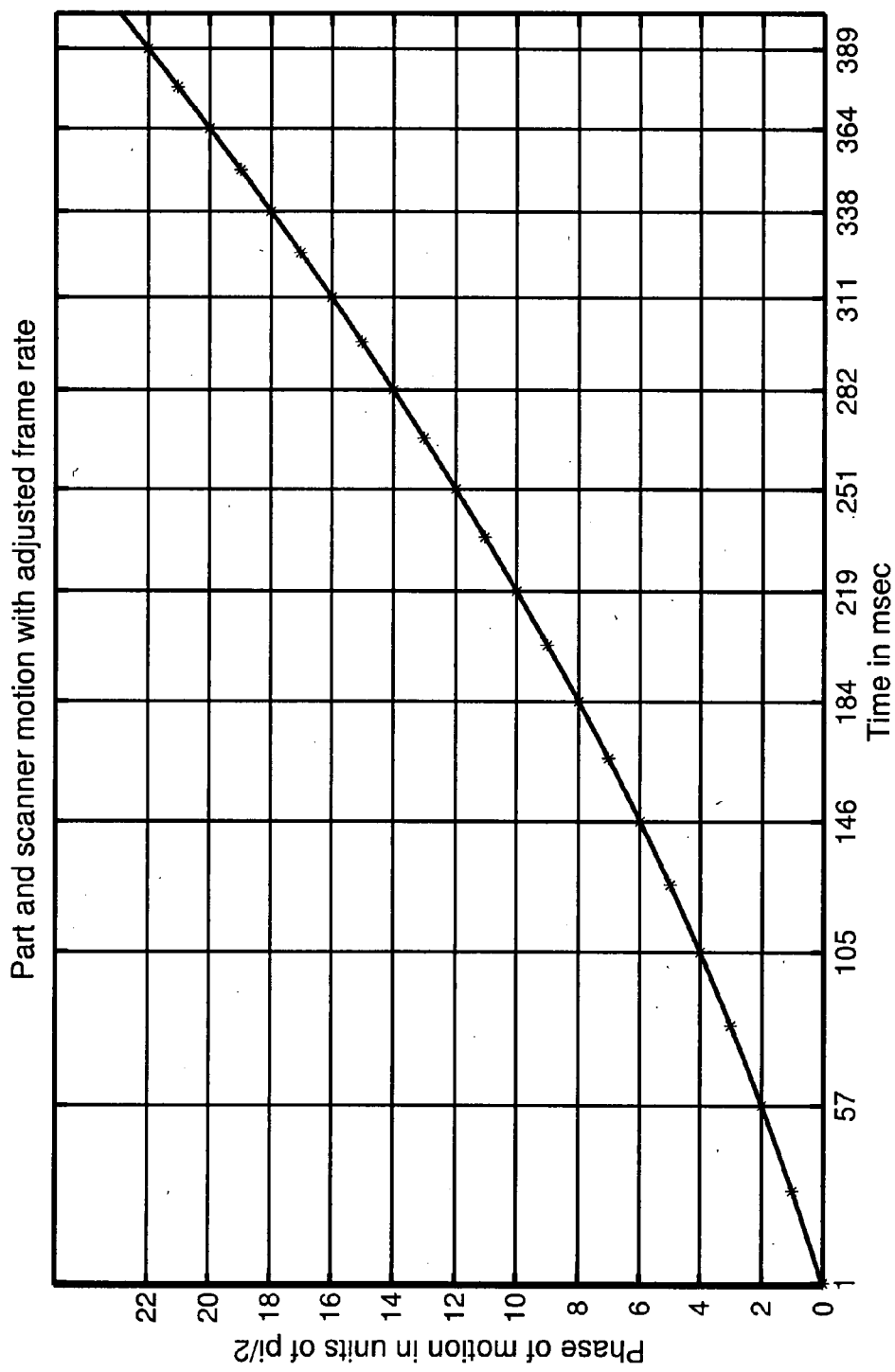
FIG. 14B is a phase-versus-motion plot showing the time intervals between acquisition frames that produced the correlogram of FIG. 14A.
Figure 15A:
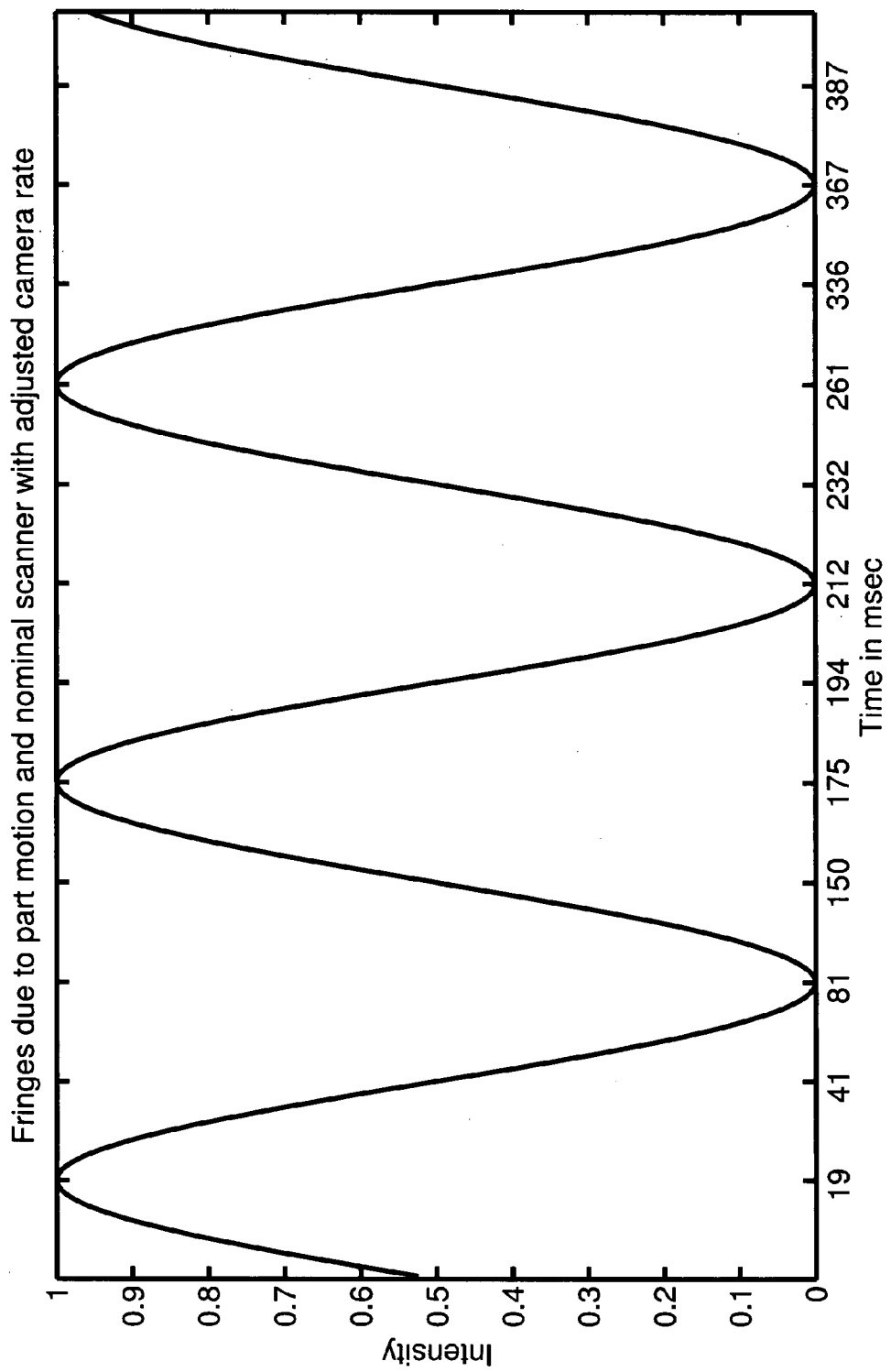
FIG. 15A is a correlogram based on the same technique shown in FIG. 14 with reference to the example of FIG. 13.
Figure 15B:
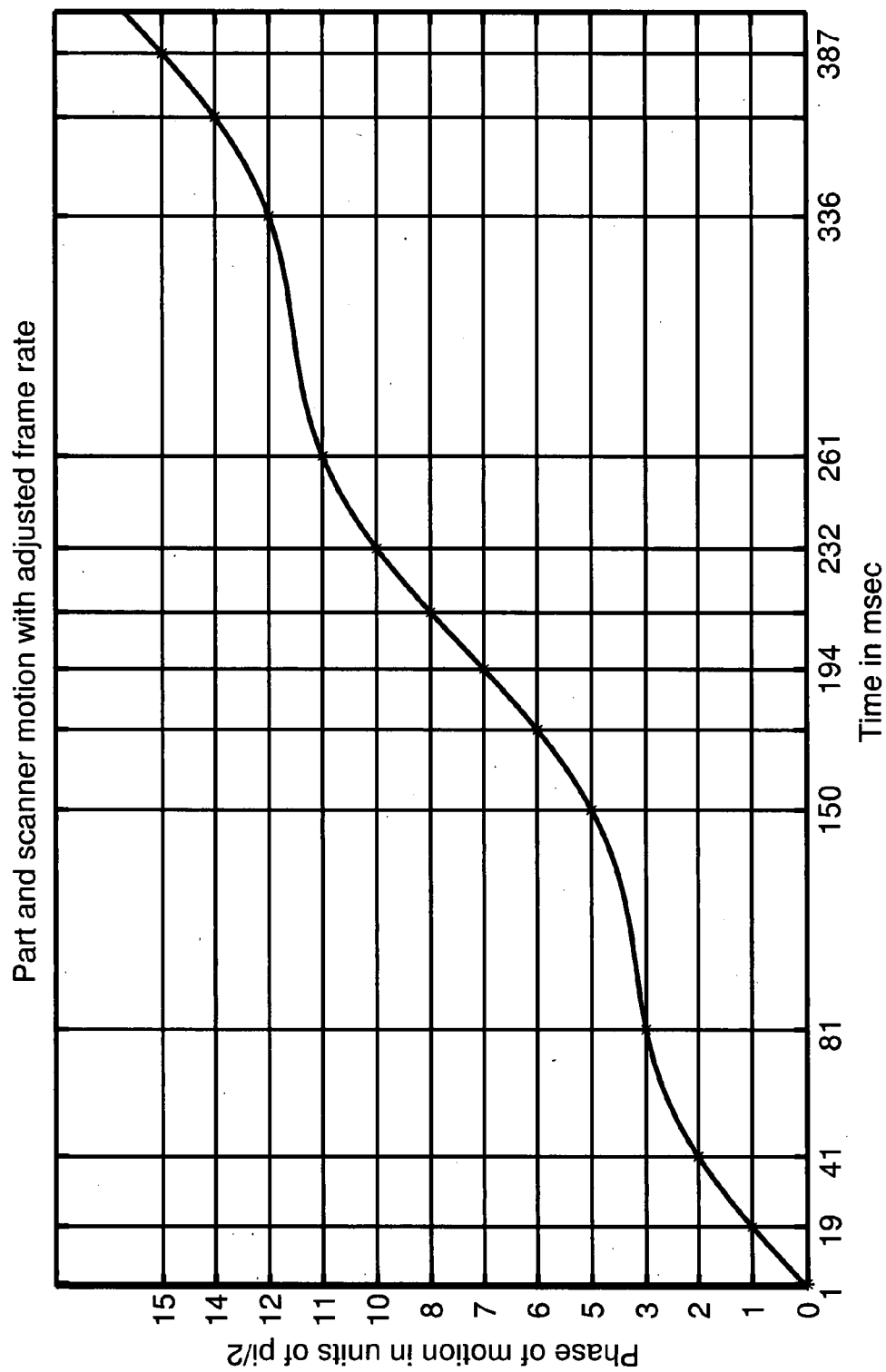
FIG. 15B is a phase-versus-motion plot showing the time intervals between acquisition frames that produced the correlogram of FIG. 15A.

It is also clear that the objectives of the invention can be achieved in equivalent fashion by changing the acquisition times between frames (the so called camera rate or triggering frequency), rather than the speed of scanning. That is, the timing of each frame is selected to coincide with the desired phase change (or fringe shift), which ensures the acquisition of light-intensity data within the operational window of the applicable algorithm. The sets of FIGS. 14A,14B and 15A, 15B, respectively, show this approach with reference to the object motion of the examples illustrated in FIGS. 12 and 13. FIGS. 14A and 15A are the correlograms produced by the adjusted frame rates shown in FIGS. 14B and 15B, respectively. In each case, the timing of acquisition between frames was established on the fly by feedback-loop control based on the most current average of phase-step size. Because the object motion was sufficiently smooth, this adaptive approach was effective in changing the intervals between acquisition frames to keep the system within its operational window.

The invention has also been described with reference to a single pixel, but it is clear that in some instances, depending on the distribution of the object motion throughout its surface, the same adjustment to the scanner motion may not be adequate to ensure scanning within the operational window of the system for all pixels of interest. In such cases, alternative approaches may be followed to conform to the deformation profile of the object. For example, different algorithms with various degrees of tolerance in their operational windows could be used to analyze separate portions of the object. MEMS could be used to produce different out-of-plane displacements in sections of the reference mirror corresponding to different portions of the object so as to approximately match the deformation profile produced during a scan. Again, adaptive optics or spatial light modulators could be similarly used.

Moreover, while the invention has been described in terms of interferometric analysis based on phase-step algorithms, it is understood that the concept is applicable to any method used in the art to determine phase or equivalent information during a scan, such as, without limitation, analysis based on phase-shifting algorithms, Fourier transforms, wavelet transforms, Hankel transforms, synchronous detection, phase-locked-look (PLL) algorithms, and sinusoid fitting algorithms. Furthermore, the invention can be utilized equally advantageously with interferometric systems based on the measurement of fringe shifts produced by various effects other than scanning (such as, without limitation, tilting-plate techniques, tilting-grating techniques, fringe projection techniques, wavelength shifting, and polarization techniques). Based on the same fundamental concept, the means that control the shifting of the fringes need to be adapted to produce fringe shifts that fall within the operational window of the system taking into account the object motion.

It is also understood that an approximation of the object motion, as required to practice the invention, may be known a priori based on the nature of the object being tested, or may be obtained by any conventional means. If sufficiently smooth, the motion profile could also be determined approximately for a pixel during a scan by tracking the size of the phase change between frames and making on-the-fly adjustments to the scanner motion to keep the phase change as close as possible to the nominal phase step (that is, to keep the system within the operational window of the analysis algorithm).

In conventional stroboscopic illumination, the frequency of the strobe and the object motion are selected so that the object appears static and any interferometric technique (PSI, VSI, etc.) can be applied. Accordingly, as would be obvious to one skilled in the art, for high frequency object motion (harmonic and quasi-harmonic), stroboscopic illumination can also be used with a strobe frequency slightly different from the frequency of the object motion (typically the frequency of the signal driving the tested element). When such a small mismatch is introduced between the signals driving the object motion and the strobe, the object appears to be moving slowly and the value of the mismatch determines how fast the object appears to be moving.

Thus, it is possible to capture fast object motion as if it were moving more slowly (that is, the fringes are not frozen but move slowly). By changing the mismatch between the object and the strobe frequencies, fringe shifts may be controlled to obtain the appropriate shifts required for the analysis of resulting intensity signals using conventional algorithms. The balance of the object motion components can then be determined from the motion of the scanner and the difference in the frequency of the strobe.

Finally, in order to further improve the measurement of the object motion, the preferred embodiment of the invention utilizes the information gathered by the contemporaneous operation of a reference signal device to establish the exact position of the scanner corresponding to each frame. Without the reference signal, the motion of the surface at each pixel is determined by keeping track of the phase of the interferometric signal produced by the object at each scan frame, converting the phase information to a position along the scan, and then subtracting from it the position of the scanner determined on the basis of its nominal phase step and the additional known motion imposed on it according to the invention. This approach is subject to the typical errors associated with scanner nonlinearities and other scanner perturbations that affect the actual phase-step size. If a reference signal is available, on the other hand, it can be used directly to extract the object motion from the object's phase information without concerns about scanner precision, as detailed in U.S. Publication No. 2002-0196450.

Therefore, while the invention has been shown and described herein in what is believed to be the most practical and preferred embodiments, it is recognized that departures can be made therefrom within the scope of the invention, which is not to be limited to the disclosed details but is to be accorded the full scope of the claims including any and all equivalents thereof.

The invention claimed is:

1. An interferometric device for measuring an out-of-plane deformation of an object surface, comprising:
   means for producing successive interferograms at a predetermined nominal rate of phase change from a light bean reflected from the object surface;
   means for implementing an algorithm for interferometric analysis of said interferograms; and
   means for changing said predetermined nominal rate such that each phase change between successive data-acquisition frames falls within an operational window of the algorithm;
   wherein said means for implementing an algorithm for interferometric analysis includes a means for calculating said out-of-plane deformation.

2. The device of claim 1, wherein said means for producing successive interferograms includes a scanner operating at said predetermined nominal rate of phase change.

3. The device of claim 1, wherein said means for producing successive interferograms includes a light detector triggered at said predetermined nominal rate of phase change.

4. The device of claim 1, wherein said means for acquiring successive interferograms includes a light source capable of varying a wavelength to produce said predetermined nominal rate of phase change.

5. The device of claim 1, wherein said means for acquiring successive interterograms includes a means for changing an index of retraction along an optical path of the intenferometric device to produce said predetermined nominal rate of phase change.

6. The device of claim 1, wherein said means for acquiring successive interferograms includes a means for changing a polarization state off an interfering light beam to produce said predetermined nominal rate of phase change.

7. The device of claim 1, wherein said means for acquiring successive interferograms includes a tilting plate used to produce said predetermined nominal rate of phase change.

8. The device of claim 1, wherein said means for acquiring successive interferograms includes a tilting grating used to produce said predetermined nominal rate of phase change.

9. The device of claim 2, wherein said means for changing said predetermined nominal rate comprises a driving signal operating on the scanner.

10. The device of claim 1, wherein said means for changing said predetermined nominal rate comprises a driving signal operating on a sample stage.

11. The device of claim 1, wherein said means for changing said predetermined nominal rate comprises a driving signal operating on a reference mirror of the interferometric device.

12. The device of claim 1, wherein said means for changing said predetermined nominal rate comprises a driving signal operating on en objective of the interferometric device.

13. The device of claim 1, further comprising a reference signal circuit applied to said means for acquiring successive interferograms.

14. The device of claim 1, wherein said means for changing the predetermined nominal rate is applied equally at each pixel of the object surface.

15. The device of claim 1, wherein said means for changing the predetermined nominal rate is applied at each pixel of the object surface as a function of said out-of-plane deformation at said pixel.

16. The device of claim 1, wherein said means for changing the predetermined nominal rate includes a substantially linear component combined with the nominal rate.

17. The device of claim 1, wherein said means for changing the predetermined nominal rate includes a substantially periodic component combined with the nominal rate.

18. A method for measuring an out-of-plane deformation of an object surface using an interferometric device, comprising the following steps:
- acquiring successive interferograms produced at a predetermined nominal rate of phase change from a light beam reflected from said object surface;
- implementing an algorithm for interferometric analysis of said interferograms; and
- changing said predetermined nominal rate such that each phase change between successive data-acquisition frames falls within an operational window of the algorithm;
- wherein said step of changing said predetermined nominal rate such that each phase change between successive data-acquisition frames falls within an operational window of the algorithm is carried out with a feedback signal based on a prior knowledge of said out-of-plane deformation of the object surface.

* * * * *